United States Patent [19]

Post

[11] Patent Number: 5,495,221
[45] Date of Patent: Feb. 27, 1996

[54] DYNAMICALLY STABLE MAGNETIC SUSPENSION/BEARING SYSTEM

[75] Inventor: Richard F. Post, Walnut Creek, Calif.

[73] Assignee: The Regents of the University of California, Oakland, Calif.

[21] Appl. No.: 207,622

[22] Filed: Mar. 9, 1994

[51] Int. Cl.$^6$ .................. H01F 5/00; H01F 7/02; H02K 7/09
[52] U.S. Cl. .................. 335/299; 335/306; 310/90.5
[58] Field of Search .................. 335/216; 310/90.5; 198/679, 690.1

[56] References Cited

U.S. PATENT DOCUMENTS

| | | | |
|---|---|---|---|
| 3,107,310 | 10/1963 | Carriere et al. | 310/103 |
| 3,146,038 | 8/1964 | Lautzenhiser | 308/10 |
| 3,356,425 | 12/1967 | Carriere et al. | 308/10 |
| 3,370,896 | 2/1968 | Atkins | 308/10 |
| 3,434,084 | 3/1969 | Milligan | 335/284 |
| 3,597,023 | 8/1971 | Baermann | 308/10 |
| 3,784,945 | 1/1974 | Baermann | 335/302 |
| 3,807,813 | 4/1974 | Milligan | 308/10 |
| 3,860,300 | 1/1975 | Lyman . | |
| 3,885,504 | 5/1975 | Baermann | 104/148 |
| 3,885,839 | 5/1975 | Habermann | 308/10 |
| 3,899,223 | 8/1975 | Baermann | 308/10 |
| 3,909,082 | 9/1975 | Ishikawa et al. | 308/10 |
| 3,954,310 | 5/1976 | Rava | 308/10 |
| 4,037,886 | 7/1977 | Boden . | |
| 4,077,678 | 3/1978 | Studer et al. | 308/10 |
| 4,080,012 | 3/1978 | Boden et al. | 308/10 |
| 4,167,296 | 9/1979 | Dendy | 308/10 |
| 4,300,807 | 11/1981 | Poupeau | 308/10 |
| 4,320,927 | 3/1982 | Sertich . | |
| 4,340,261 | 7/1982 | Wehde | 308/10 |
| 4,381,875 | 5/1983 | Studer | 308/10 |
| 4,583,752 | 4/1986 | Breitbach | 280/6 |
| 4,623,202 | 11/1986 | Shingu | 310/90.5 |
| 4,988,906 | 1/1991 | Littlefield | 310/90.5 |
| 5,010,563 | 4/1991 | Laurent et al. | 378/132 |
| 5,218,257 | 6/1993 | Tozoni | 310/90.5 |
| 5,256,638 | 10/1993 | Weinberger | 505/1 |
| 5,330,967 | 7/1994 | Takahata | 505/166 |

*Primary Examiner*—Leo P. Picard
*Assistant Examiner*—Stephen T. Ryan
*Attorney, Agent, or Firm*—Henry P. Sartorio; John P. Wooldrige

[57] ABSTRACT

A magnetic bearing system contains magnetic subsystems which act together to support a rotating element in a state of dynamic equilibrium. However, owing to the limitations imposed by Earnshaw's Theorem, the magnetic bearing systems to be described do not possess a stable equilibrium at zero rotational speed. Therefore, mechanical stabilizers are provided, in each case, to hold the suspended system in equilibrium until its speed has exceeded a low critical speed where dynamic effects take over, permitting the achievement of a stable equilibrium for the rotating object. A state of stable equilibrium is achieved above a critical speed by use of a collection of passive elements using permanent magnets to provide their magnetomotive excitation. The magnetic forces exerted by these elements, when taken together, levitate the rotating object in equilibrium against external forces, such as the force of gravity or forces arising from accelerations. At the same time, this equilibrium is made stable against displacements of the rotating object from its equilibrium position by using combinations of elements that possess force derivatives of such magnitudes and signs that they can satisfy the conditions required for a rotating body to be stably supported by a magnetic bearing system over a finite range of those displacements.

36 Claims, 16 Drawing Sheets

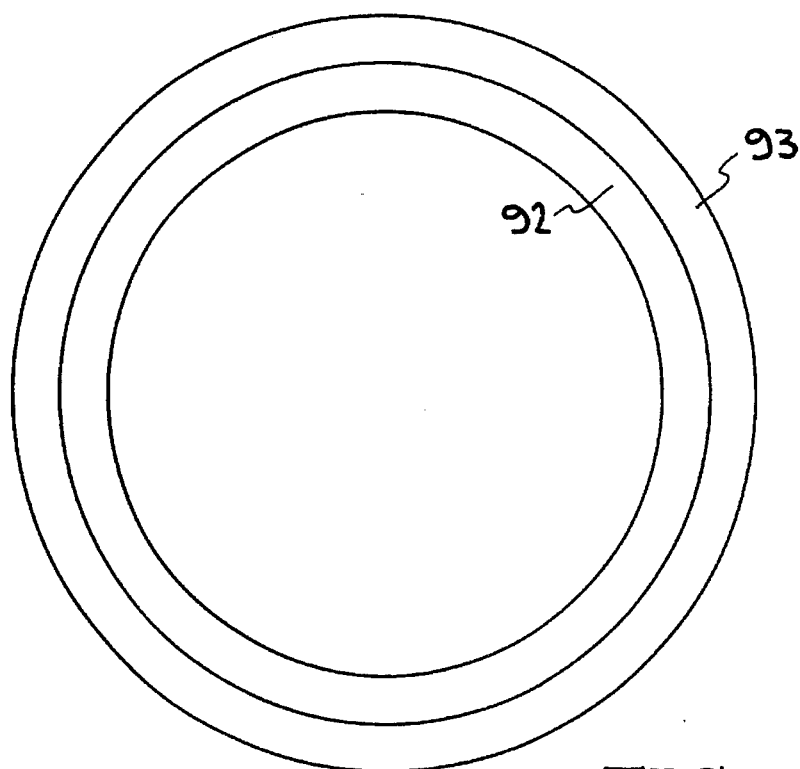
FIG. 14A
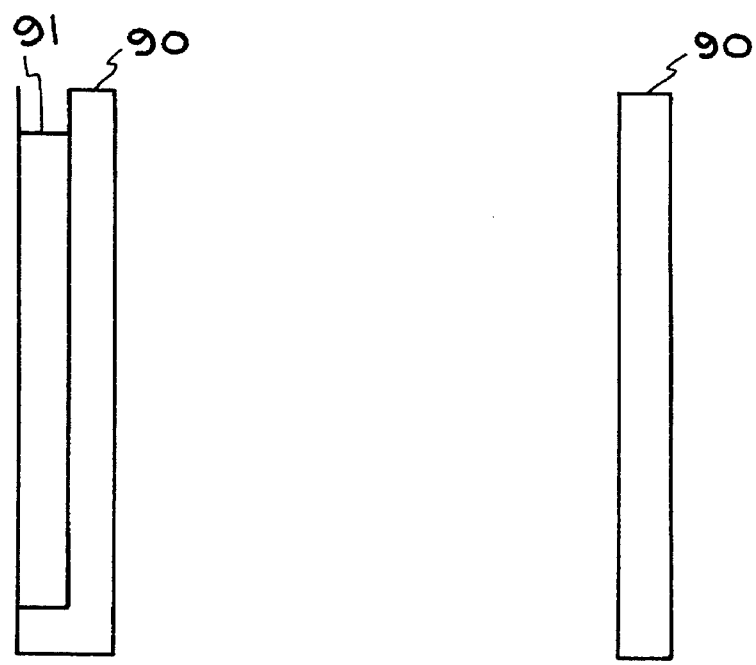
FIG. 14B  FIG. 14C

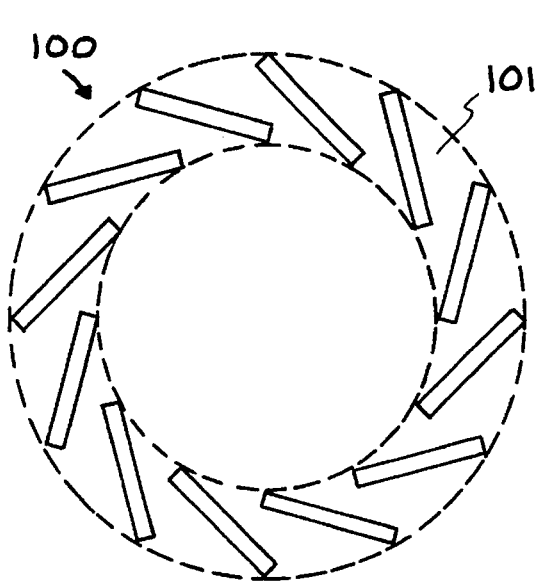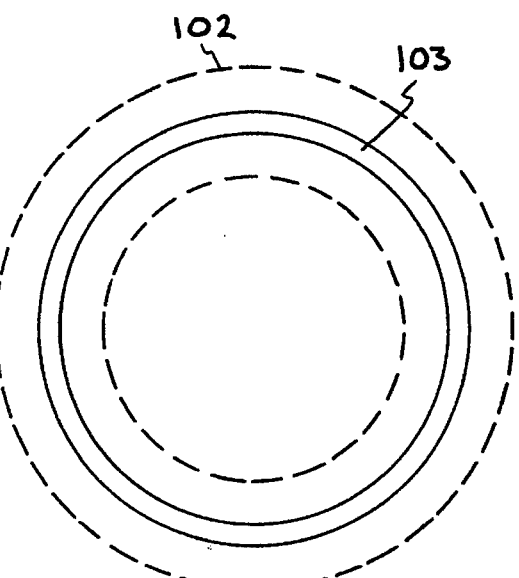
FIG. 15A  FIG. 15B
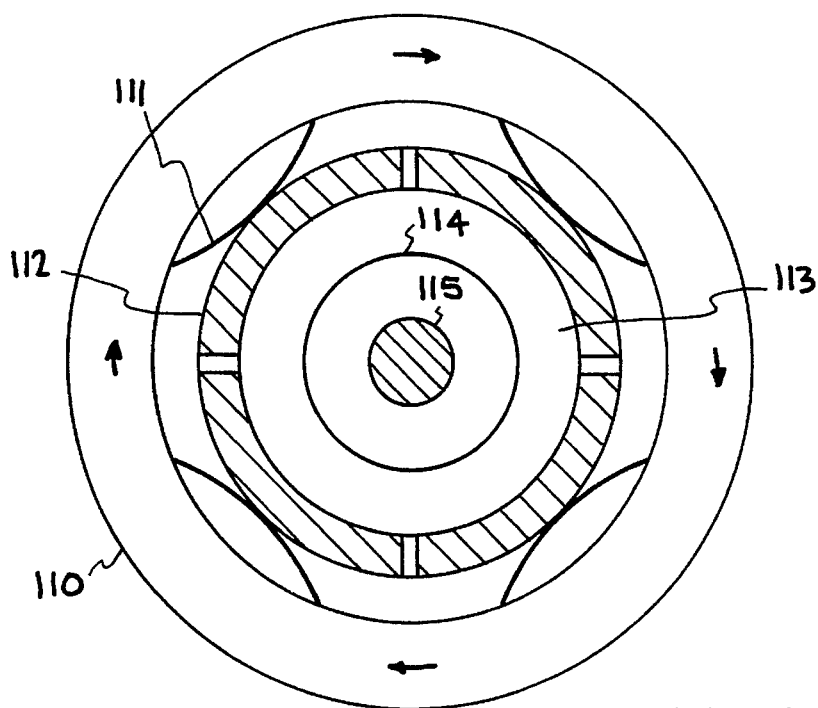
FIG. 16

(5,495,221)

DYNAMICALLY STABLE MAGNETIC SUSPENSION/BEARING SYSTEM

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to magnetic bearing/suspension systems for the near-frictionless support of rotating elements, such as flywheels, electric motors and generators and the like. More specifically, the invention is directed to a dynamically stable, passive, totally magnetically energized bearing/suspension system that does not require electrically activated servo controlled systems to attain a stable equilibrium at operating speed.

2. Description of Related Art

Motor and generator armatures, flywheel rotors, and other rotatable components have conventionally been supported and constrained against radially and axially directed forces by mechanical bearings, such as journal bearings, ball bearings, and roller bearings. Such bearings necessarily involve mechanical contact between the rotating element and the bearing components, leading to problems of friction and wear that are well known. Even non-contacting bearings, such as air bearings, involve frictional losses that can be appreciable, and are sensitive to the presence of dust particles. In addition, mechanical bearings, and especially air bearings, are poorly adapted for use in a vacuum environment.

The use of magnetic forces to provide a non-contacting, low friction equivalent of the mechanical bearing is a concept that provides an attractive alternative, one which is now being exploited commercially for a variety of applications. All presently available commercial magnetic bearing/suspension elements are subject to limitations, arising from a fundamental physics issue, that increase their cost and complexity. These limitations make the conventional magnetic bearing elements unsuitable for a wide variety of uses where complexity-related issues, the issue of power requirements, and the requirement for high reliability are paramount.

The physics issue referred to is known by the name of Earnshaw's Theorem. According to Earnshaw's Theorem (when it is applied to magnetic systems), any magnetic suspension element, such as a magnetic bearing that utilizes static magnetic forces between a stationary and a rotating component, cannot exist stably in a state of equilibrium against external forces, e.g. gravity. In other words if such a bearing element is designed to be stable against radially directed displacements, it will be unstable against axially directed displacements, and vice versa. The assumptions implicit in the derivation of Earnshaw's Theorem are that the magnetic fields are static in nature (i.e. that they arise from either fixed currents or objects of fixed magnetization) and that diamagnetic bodies are excluded.

The almost universal response to the restriction imposed by Earnshaw's Theorem has been the following: Magnetic bearing elements are designed to be stable along at least one axis, for example, their axis of symmetry, and then external stabilizing means are used to insure stability along the remaining axes. The "means" referred to could either be mechanical, i.e. ball bearings or the like, or, more commonly, electromagnetic. In the latter approach magnet coils are employed to provide stabilizing forces through electronic servo amplifiers and position sensors that detect the incipiently unstable motion of the rotating element and restore it to its (otherwise unstable) position of force equilibrium.

Less common than the servo-controlled magnetic bearings just described are magnetic bearings that use superconductors to provide a repelling force acting against a permanent magnet element in such a way as to stably levitate that magnet. These bearing types utilize the flux-excluding property of superconductors to attain a stable state, achieved by properly shaping the superconductor and the magnet so as to provide restoring forces for displacements in any direction from the position of force equilibrium. Needless to say, magnetic bearings that employ superconductors are subject to the limitations imposed by the need to maintain the superconductor at cryogenic temperatures, as well as limitations on the magnitude of the forces that they can exert, as determined by the characteristics of the superconductor employed to provide that force.

The magnetic bearing approaches that have been described represent the presently utilized means for creating a stable situation in the face of the limitations imposed by Earnshaw's Theorem. The approach followed by the first one of these (i.e., the one not using superconducting materials) is to overcome these limitations by introducing other force-producing elements, either mechanical, or electromagnetic in nature, that restore equilibrium. The latter, the servo-controlled magnetic bearing, is usually designated as an "active" magnetic bearing, referring to the active involvement of electronic feedback circuitry in maintaining stability.

It is the purpose of the present invention to describe what can be called a "passive" magnetic bearing system. That is, a combination of stationary and rotating elements that together achieve a stable state against perturbing forces without the need for either mechanical, diamagnetic, or electronically controlled servo systems.

It differs fundamentally from the prior art in that it provides a magnetic bearing system (as opposed to a magnetic bearing element) that can support a rotating object, and that achieves a dynamically stable state, even though any one of its elements, taken alone, would be incapable of stable static levitation. The virtues of the invention described herein are in the great reduction in complexity that results, together with concomitant increases in reliability, reductions in cost, and virtual elimination of power losses that it permits, relative to systems using servo-controlled magnetic bearings.

Because of these improved characteristics it is expected that magnetic bearing systems based on the teachings of this invention will find uses in a variety of applications. These include, for example, electromechanical batteries (modular flywheel energy storage devices), high-speed spindles for machining, hard-disc drive systems for computers, electric motors and generators, rotating target x-ray tubes, and other devices where simplified magnetic bearing systems can satisfy a long-standing practical need for low-friction, maintenance-free, bearing systems.

SUMMARY OF THE INVENTION

It is an object of the present invention to provide a system that satisfies the conditions required for a rotating body to be stably supported by a magnetic bearing system.

It is another object of the present invention to provide novel forms and combinations of the elements of such a system that satisfy these conditions under dynamic conditions, i.e., when the rotation speed exceeds a lower critical value.

The invention achieves a state of stable equilibrium above a critical speed by use of a collection of passive elements using permanent magnets to provide their magnetomotive excitation. The magnetic forces exerted by these elements, when taken together, levitate the rotating object in equilibrium against external forces, such as the force of gravity or forces arising from accelerations. At the same time, this equilibrium is made stable against displacements of the rotating object from its equilibrium position by using combinations of elements that possess force derivatives of such magnitudes and signs that they can satisfy the conditions required for a rotating body to be stably supported by a magnetic bearing system over a finite range of those displacements.

The invention can be described as a magnetic bearing system containing at least two discrete subsystems, at least one of which is energized by permanent-magnet material. (More typically, three to four subsystems would be employed). These subsystems, when properly disposed geometrically, act together to support a rotating element in a state of dynamic equilibrium. However, owing to the limitations imposed by Earnshaw's Theorem, the magnetic bearing systems to be described do not possess a stable equilibrium at zero rotational speed. Therefore, means are provided to hold the suspended system in equilibrium until its speed has exceeded a low critical speed where dynamic effects take over and thereby permit the achievement of a stable equilibrium for the rotating object.

BRIEF DESCRIPTION OF THE DRAWINGS

FIG. 2b is a top view of the repelling magnetic bearing element of FIG. 2a.

FIG. 4b is a top view of the compound attractive magnetic bearing element FIG. 4a.

FIG. 6b is a top view of the axially symetric reduced derivative attractive magnetic bearing element of FIG. 6a.

FIG. 7b is a top view of the repelling-type magnetic bearing element of FIG. 7a.

FIG. 9b is a side view of the embodiment of a slotted pole magnetic bearing element of FIG. 9a.

FIG. 14a is a magnetic bearing element using non-linear resistance material.

FIG. 14b is a side view of the magnetic bearing element using non-linear resistance material of FIG. 14a.

FIG. 14c is a front view of the magnetic bearing element using non-linear resistance material of FIG. 14a.

FIG. 14d is an equivalent circuit useable as an alternate to the non-linear resistance material of FIG. 14a.

FIG. 15a is a top view of an embodiment of an axially repelling magnetic bearing element.

FIG. 15b shows a top view of an embodiment of an axially repelling magnetic bearing element.

FIG. 16 shows a centrifugally disengaging mechanical bearing with portions in cross-section.

FIG. 17b is a bottom view of the three element magnetic bearing system with axial stabilization of FIG. 17a.

DETAILED DESCRIPTION OF THE INVENTION

Figure 1:
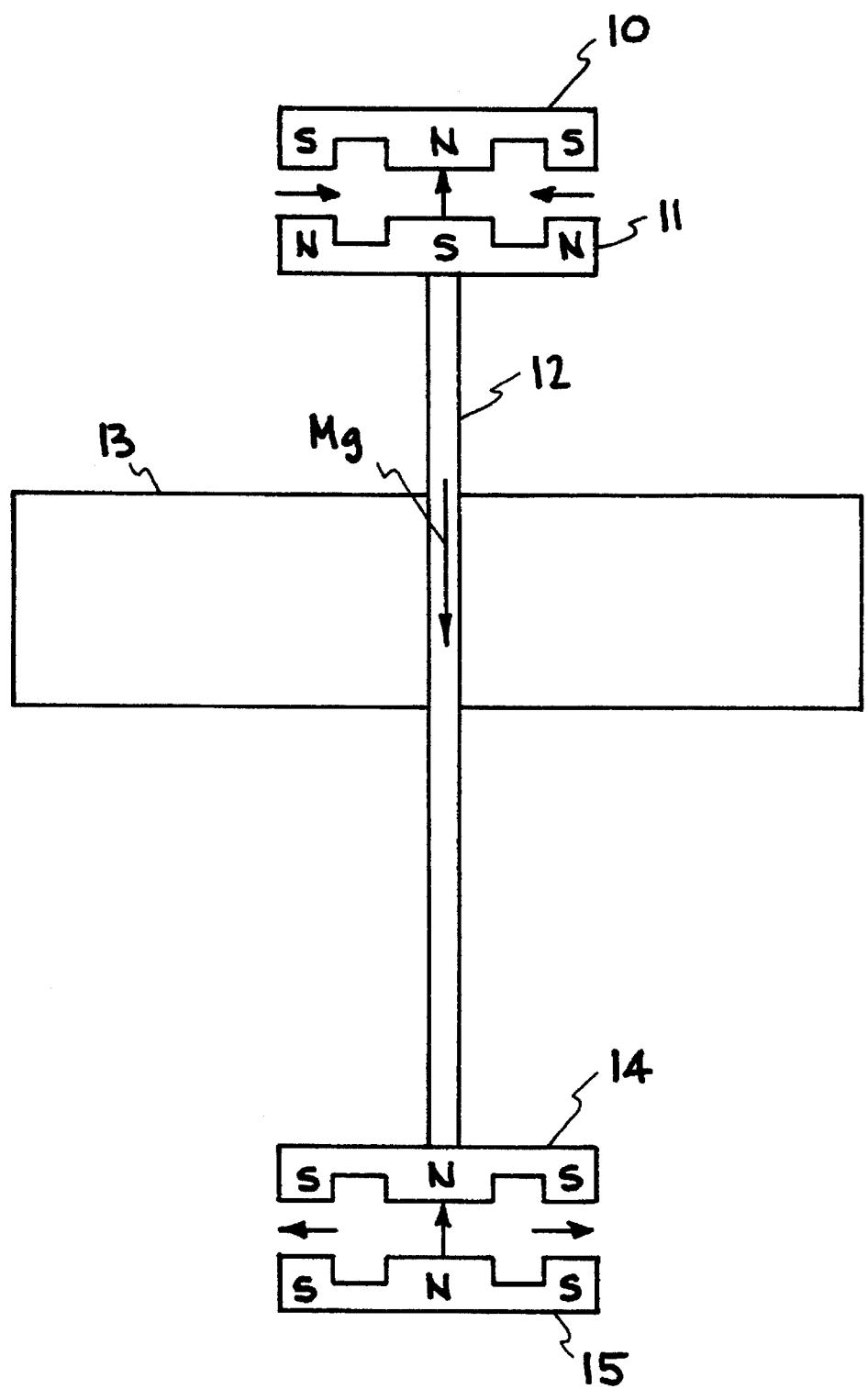
FIG. 1 shows a vertical-axis system.

Before describing the various embodiments of the subject invention it is necessary to outline some of the theoretical considerations that undergird its operation. As a starting point, the conditions that must be satisfied in order for the suspended object (for example, a flywheel rotor) to exist in a state of force equilibrium will be defined. As an example, consider a vertical-axis system such as is shown in FIG. 1. This figure shows a rotor subjected to the force of gravity and to forces from a bearing/suspension system, with the forces being shown as vectors. Shaft 12 and rotor 13 are supported by an upper attractive bearing comprised of a stationary component 10 and a rotating part 11, and by a lower, repelling bearing composed of a rotating element 14 and a stationary element 15. Not shown are the permanent magnet elements within the bearing elements needed to energize them. In the vertical direction the upward forces exerted by the top and bottom bearing must sum up to the downward force of gravity. Designating these vertical-acting forces as $F_{vA}$ (upper bearing elements) and $F_{vB}$ (lower bearing elements), the equation for vertical force equilibrium becomes:

$$F_{vA} + F_{vB} - Mg = 0, \qquad [1]$$

where M is the mass of the rotor, and g is the acceleration of gravity. Since the vertical force exerted by the bearing elements depends on the axial position of the rotating element relative to the stationary element, there will be a unique axial position of the rotor where this equation can be satisfied (assuming sufficient lifting power for the two bearings combined, of course).

For displacements at either end in the radial direction, the condition for force equilibrium (assuming no lateral accelerations) is simply that there be no net radial force exerted by the bearing elements. For axially symmetric bearings this condition will be automatically satisfied when the axis of the rotating element coincides with the axis of the stationary element, as shown schematically in FIG. 1. In this centered position (and only in this position) any internal radial forces exerted, for example, by magnets used in the bearing element will be exactly canceled.

While the above prescription, if followed, will assure that the rotating elements (rotor plus rotating parts of the magnetic bearing system) exist in a state of equilibrium against external and internal forces, it does not say anything about whether this equilibrium is a stable one. To achieve a stable state against displacements from the position of force equilibrium it is necessary to impose new constraints, in this case on the derivatives of the forces themselves, that is, on the rates at which the forces exerted by the bearing elements vary with displacements from equilibrium. Thus, it will be necessary to satisfy quantitative constraints on certain vector sums of these derivatives for the plurality of bearing elements, acting in concert. In order to satisfy these constraints it will be required to employ special designs for each of the bearing elements, and this invention provides unique magnetic bearing elements that are capable of satisfying the quantitative requirements on the force derivatives.

Before listing the equations defining the conditions under which the bearing systems described herein are stable under displacements from a position of force equilibrium, it is necessary to define the nature of the displacements that must be considered. There are three: The first is an axial displacement (up or down in the case shown in FIG. 1). The second is a transverse displacement, without tilting of the axis of rotation. The third is a symmetric tilt about an axis that is perpendicular to the axis of rotation and is located midway between the upper and lower bearing elements. It can be seen that an arbitrary displacement can be described as a linear combination of these three basic displacements.

A rotating system can be described as being supported stably provided that a displacement from its equilibrium position in any direction results in a restoring force that returns it to that equilibrium position. The mechanical analogy is an object suspended by pairs of tension springs that lie above and below, to the left and right, and in front of and behind the object. As can be seen intuitively, if the object is momentarily displaced in any direction from its equilibrium position it will feel a restoring force that will cause it to return to its equilibrium position after transients have died out.

A mechanical tension spring has the property that the force it exerts increases as it is stretched, in other words, that force can be expressed (for small displacements) through a force derivative, as follows:

$$F=(dF/dx)Dx, \quad [2]$$

where Dx is the displacement and dF/dx is the rate of change of the force with displacement. It is common practice to represent the force derivative of springs by the letter K, so that our equation can be written as:

$$F=-K_x Dx, \quad [3]$$

where the subscript "x" refers to the spring constant for displacements in the x direction. The minus sign in equation [3] arises from the convention that a mechanical spring always operates in a way to oppose the displacement, resulting in a force that is directed oppositely to the displacement.

By analogy to the spring, the force derivatives of magnetic bearing elements can be represented by values of constants K, with one important difference: In the case of magnetic bearing elements these constants may be either positive (forces anti-parallel to the displacement, i.e., restoring forces) or negative (forces parallel to the displacement). In fact, Earnshaw's Theorem tells us that any simple magnetic bearing element, if it is restoring for one type of displacement, say radial, will always be destabilizing for the other displacement, here axial. From this fact follows the need for servo control of conventional magnetic bearings. It is therefore apparent that the use of a single simple magnetic levitating bearing element, whether it be attractive (above the rotor in FIG. 1) or repelling (below in FIG. 1) cannot lead to a stable equilibrium. As set forth in this invention, in order to achieve a stable equilibrium using only passive elements (e.g. permanent magnets to provide the magnetomotive force) it is necessary to use a combination of elements, designed so that they together satisfy prescribed quantitative conditions on their force derivatives.

It is the purpose of this invention to set forth quantitatively the conditions required for a rotating body to be stably supported by a magnetic bearing system and to show unique designs and combinations of the elements of such a system that satisfy these conditions under dynamic conditions, i.e., when the rotation speed exceeds a lower critical value.

Theoretical analyses of the conditions for positional stability of a magnetically levitated rotating object yield the following conditions:

For stability against displacements parallel to the axis of rotation, it is required that:

$$\sum_j K_{zj} > 0, \quad [4]$$

where $K_{zj}$ is the value of the spring constant (negative of the force derivative) in the z (axial) direction for the jth bearing element. The physics content of this equation is that it describes the requirement that the net force derivative of the magnetic bearing system should be positive, i.e. that there should exist a net restoring force for displacements in the axial direction.

A necessary and sufficient condition for stability against radial translational displacements (no tilt) is simply that:

$$\sum_j K_{rj} > 0, \quad [5]$$

where $K_{rj}$ is the value of the spring constant (negative of the force derivative) in the r (radial) direction for the jth bearing element. It is clear from what has been said earlier that it is not possible to satisfy both of these conditions with simple bearing elements if j <2. It can also be shown that it is also impossible to achieve better than a neutrally stable (i.e. incipiently unstable) situation with simple passive elements even if j ≧2. To achieve a truly stable state it is necessary to use special elements, so designed as to achieve, together with the other element or elements, the quantitative requirements imposed by equations [4] and [5].

The satisfaction of the two equations, [4] and [5], will insure the existence of an equilibrium that is stable against both axial and radial-translational displacements. It may not, however, insure stability against tilt-type displacements. There are two possible avenues to insuring tilt stability, while at the same time maintaining stability against the other two classes of displacement.

The first way is to insure that, in equation [5], those values of $K_{rj}$ associated with a given location (i.e. top or bottom in FIG. 1) are net positive, i.e. if the $K_r$ value of one of the two adjacent elements is negative in sign, then the $K_r$ value of the other element must be positive and larger in magnitude than the negative one. This condition will be satisfied in some of the embodiments of the invention that are described herein. A second way is to take advantage of gyroscopic effects to stabilize an otherwise tilt unstable system in which, even though equation [5] is satisfied, one (or more) of the values of $K_{rj}$ is sufficiently negative that the K values of two adjacent bearing elements (the bottom two in FIG. 1) add up to a net negative value. In this case above a low critical speed (which can be calculated theoretically, and which can be made to lie below the intended operating speed range of the rotating system) the system will be stable. Below that speed it will be necessary (as it is in other embodiments to be described) to use disengaging mechanical or other elements to keep the system stable for speeds lower than the critical speed.

In summary, the invention to be described achieves a state of stable equilibrium above a critical speed by use of a collection of passive elements using permanent magnets to provide their magnetomotive excitation. The magnetic forces exerted by these elements, when taken together, levitate the rotating object in equilibrium against external forces, such as the force of gravity or forces arising from accelerations. At the same time, this equilibrium is made stable against displacements of the rotating object from its equilibrium position by using combinations of elements that possess force derivatives of such magnitudes and signs that they can satisfy the requirements implied by equations [4] and [5] over a finite range of those displacements. In other words, the invention comprises at least one rotating member having a central axis of rotation; magnetic means for stabilization of said rotating member above a critical angular velocity, wherein said magnetic means comprise a plurality of elements comprised of stationary and co-rotating parts, said elements having force derivatives of such magnitudes and signs that they together satisfy the requirement that the negative of the sum of the time averaged derivatives of the force exerted between said stationary and said rotating part of each element in the axial direction is greater than zero; the negative of the sum of the time averaged derivatives of the force between said stationary and said rotating part of each element in the radial direction is greater than zero; and the sum of the vertical forces exerted by the stationary elements on the rotating elements is at least equal to the force of gravity on said rotating elements and any other co-rotating elements to which they are attached; and means for sustaining said rotating member in stable equilibrium until said rotating member has exceeded said critical angular velocity.

Before describing the specific embodiments of the invention the passive elements that will be used, in various combinations, to achieve positional stability in these embodiments will be described. The first class of these are near-conventional in their configuration, but of unique design in that their configuration and structure is chosen so as to satisfy the quantitative requirements on their force derivatives that have been described previously.

Figure 2A:
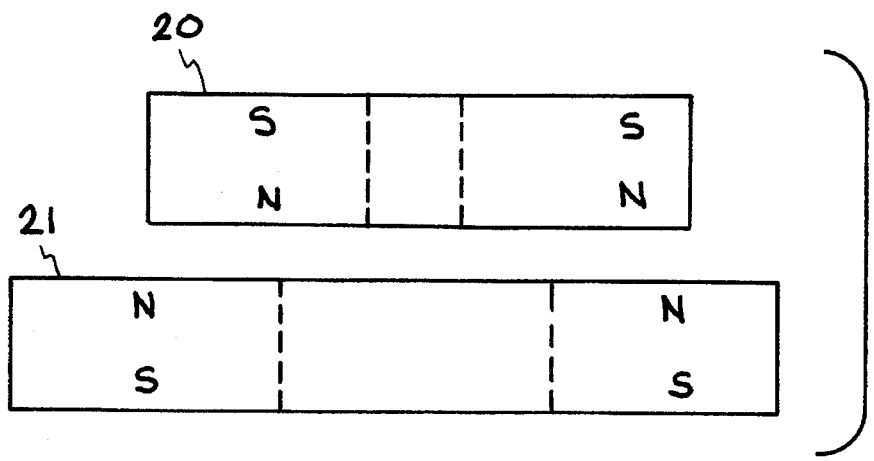
FIG. 2a is a side view of a repelling magnetic bearing element.
Figure 2B:
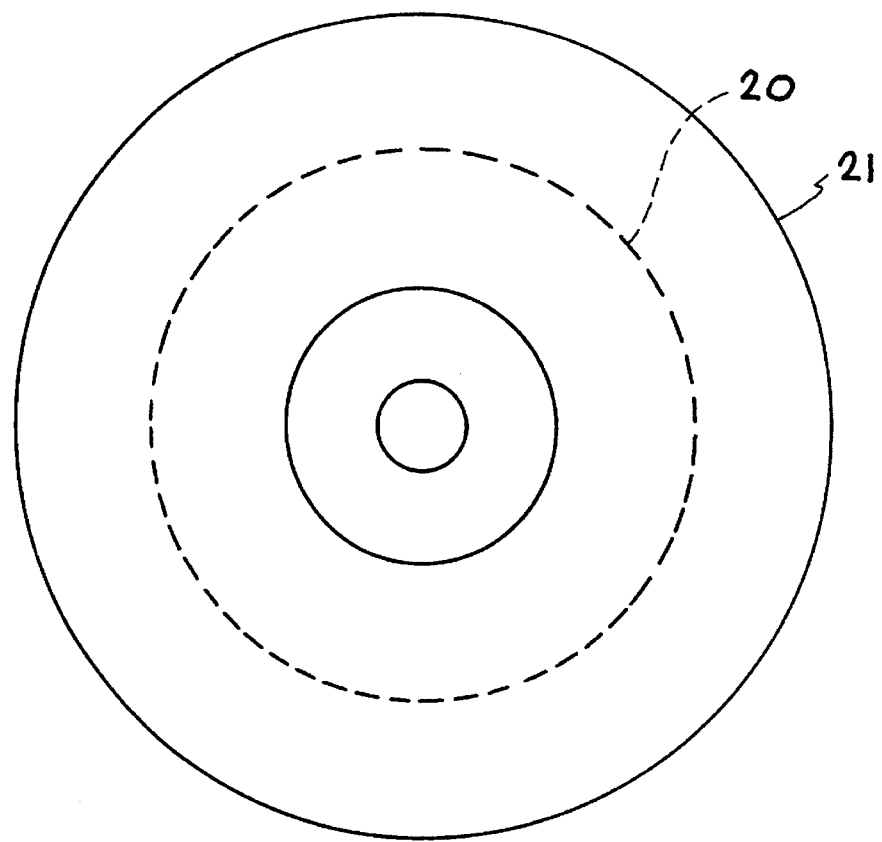
Figure 3:
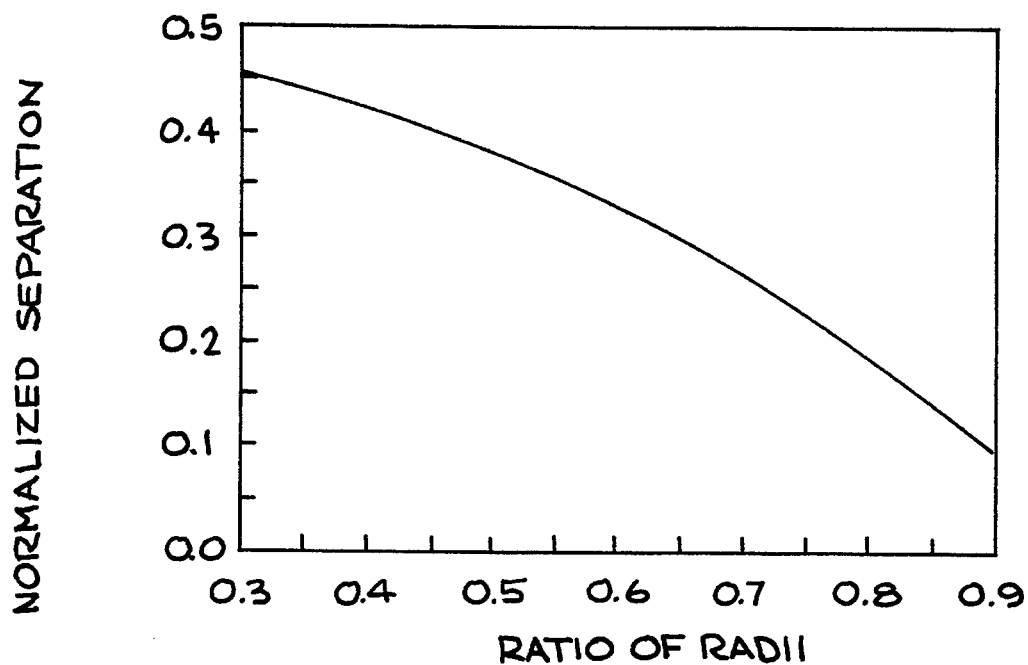
FIG. 3 is a graph of the diameter ratios between two ring magnets.

FIGS. 2a and 2b depict a repelling (levitating) magnetic bearing element made up of two annular rings made of permanent magnet material magnetized in the directions shown. The magnetic bearing element is made of a rotating upper element 20, and a stationary lower element 21. As seen in the figures, the diameter of the upper ring is different from that of the lower ring, and this difference in diameter is essential to its proper operation and distinguishes this repelling bearing element from those used in previous magnetic bearing systems. In the example shown the upper ring 20 is the rotating component, while the lower ring 21 is stationary. A theoretical analysis of the repelling (vertical) force for this pair of rings shows that the force is always repulsive, but that it has a maximum value at a calculable height above the lower ring. In the centered position shown the horizontally directed force is, of course, zero. If one now calculates the derivatives of the force, both vertical and horizontal, the following is found. At the point of maximum vertical force the first derivative of the force is zero, both for vertical and horizontal displacements with respect to that position. Above that position the force derivative for vertical displacements is negative (i.e. the $K_z$ value is positive), corresponding to an axially stable situation. That is, a weight equaling the repulsive force at that position would be stably levitated, as far as vertical displacements are concerned. When the value of $K_r$ at that same position is calculated, it is found to be negative (radially unstable) and equal in magnitude to 50 percent of the value of $K_z$. The negative sign is to be expected from Earnshaw's Theorem; the factor of 2 reduction comes from the circular average of the forces between the magnets. It is important to note that if the diameters of the two magnets had been the same, there would have been no maximum point in the repulsive force at a finite vertical separation between the magnets, thus no place where both the axial and radial K values vanished, or in the vicinity of which they could be made small. To illustrate this point, FIG. 3 shows the locus of points representing the diameter ratios (horizontal axis) and vertical separations (vertical axis) between two ring magnets, points where the force derivatives approach zero. The curve shown is representative; for thicker rings or different hole sizes somewhat different plots would result. It should also be apparent that the desired property, i.e., the achievement of control over the force derivatives by adjustment of size and relative position of annular permanent magnet elements, will also apply if the smaller of the two magnet elements fits within the hole of the larger element, so that the two are nested together. For this case the locus curve of zero force derivatives will of course deviate from that shown in FIG. 3.

Figure 4A:
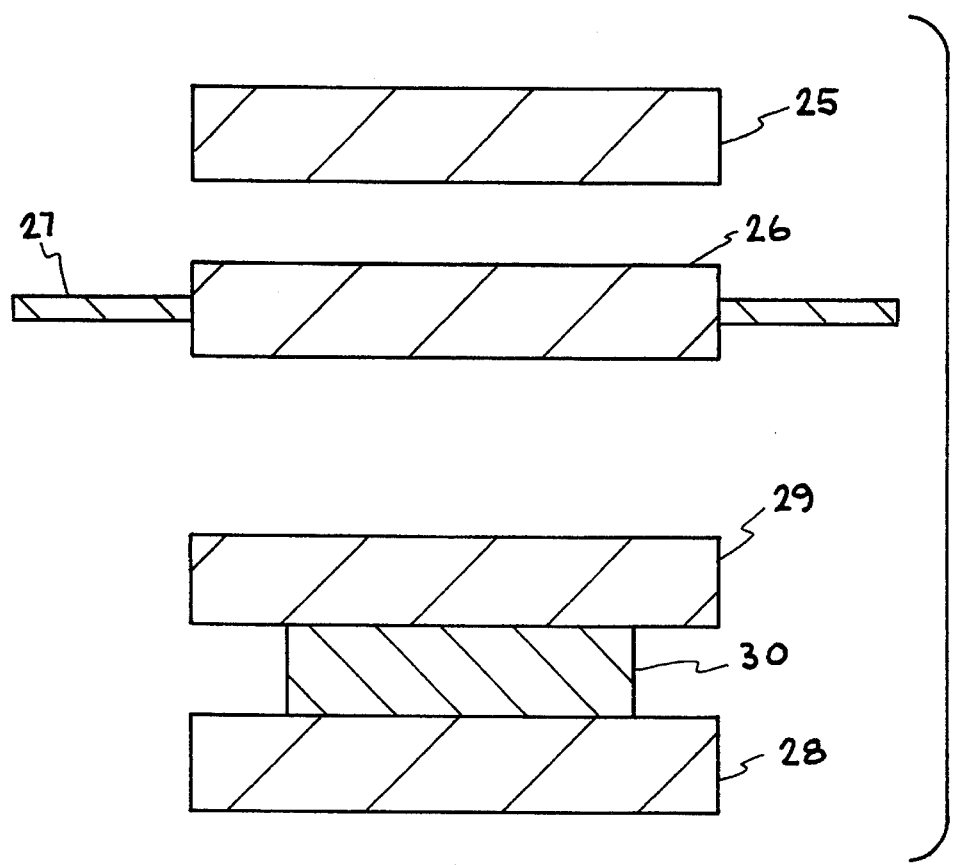
FIG. 4a is a side view in cross-section of a compound attractive magnetic bearing element.
Figure 4B:
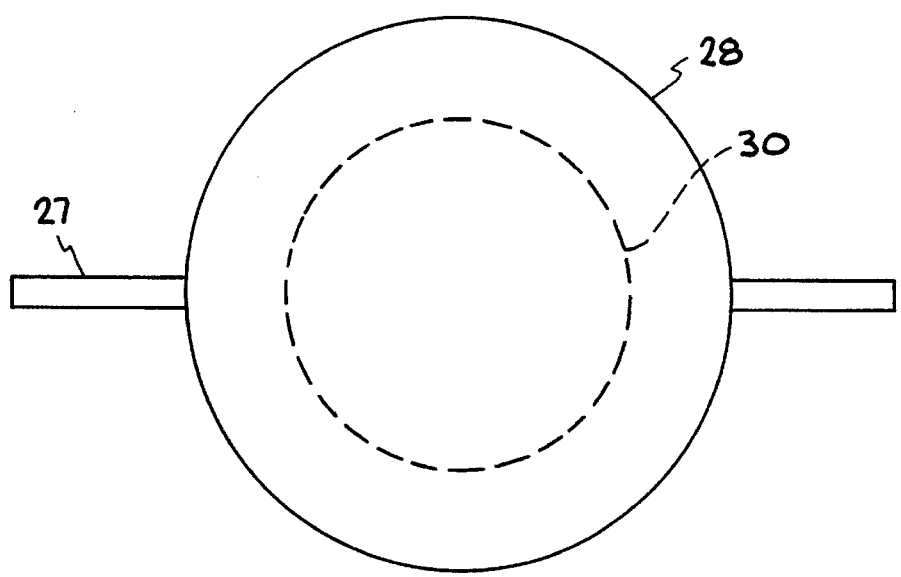

FIGS. 4a and 4b depict schematically a compound attractive magnetic bearing element comprised of upper stationary elements 25 and 26, wherein element 25 is fabricated from permanent magnet material, and element 26 is fabricated from a "soft" magnetizable material such as iron. The rotating parts of the bearing also include an element 28 made of permanent-magnet material and an element 29 made of soft magnetizable material. They are coupled mechanically with a spacer 30 made of non-magnetic material, such as aluminum. Upper element 26 is held in place by support 27, which couples to spring-like or resilient material, not shown, for the purpose of damping out oscillations of the rotating parts that are supported by lower bearing elements 28, 29, and 30.

FIGS. 4a and 4b depicts an alternative method of achieving control of the force derivatives through design. In these figures, two equal-diameter permanent-magnet discs (or annular rings) are used. In the gap between them disc- or washer-shaped iron pole pieces are held in place by non-magnetic material supports. In operation one of these disc pairs would be stationary, and the other one would be attached to co-rotating elements, such as a flywheel rotor. By adjusting the spacing of these discs relative to the permanent-magnet elements, the attractive (or repulsive) force and its derivatives can be controlled in order to meet design criteria. Since the non-rotating iron pole piece need not be rigidly coupled to its surroundings, it could be connected to compliant and/or energy-dissipating supports to suppress whirl-type instabilities. Because the mass of this pole piece is designed to be less than the mass of its permanent-magnet exciter assembly, it will be able to better respond to the dynamic effects associated with whirl effects, and be better able to suppress them.

Figure 5:
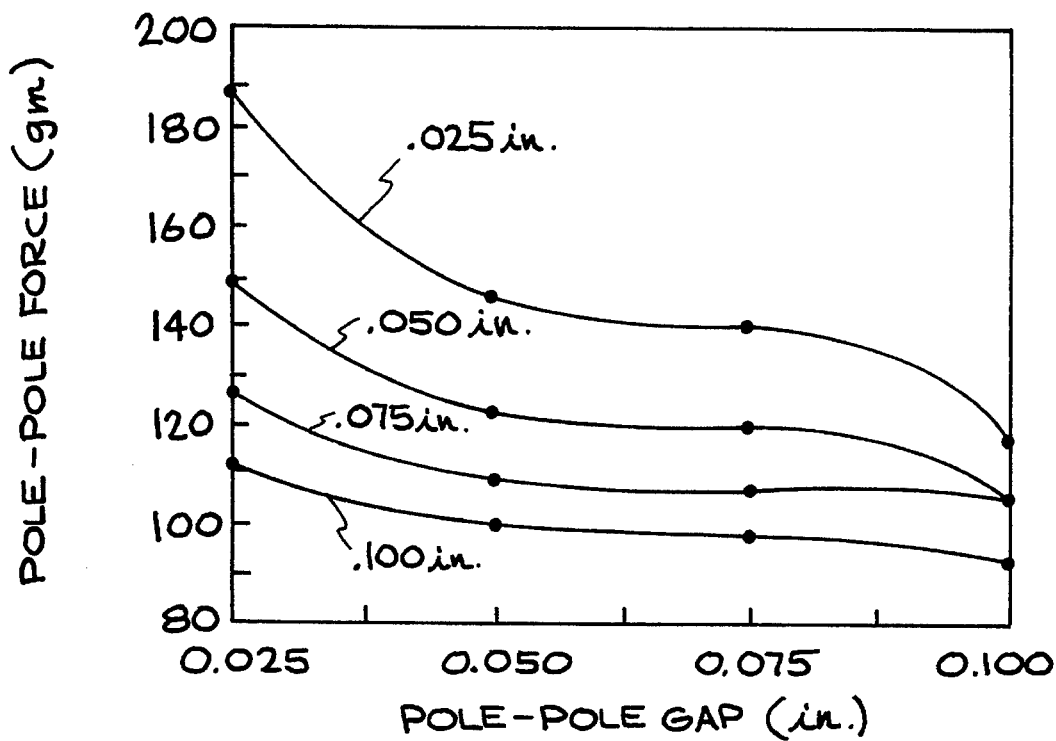
FIG. 5 is a plot of attractive force versus displacement.

FIG. 5 shows a plot of the calculated attractive force between a systems such as is shown in FIGS. 4a and 4b. Over an appreciable range of separations, the plot of attractive force versus displacement is nearly flat, corresponding to a small, and pre-determinable value of the axial force derivative.

The primary purpose of the special configurations just described is to provide a levitating permanent magnet bearing element where the magnitude of the force derivatives can be adjusted in order that this element, when taken together with other elements to be described, can satisfy the quantitative requirements for positional stability embodied in equations [4] and [5].

The same theory that gave the analysis of the repelling pair of magnets shown in FIGS. 2a and 2b also can give the force and force derivatives for a case where the direction of magnetization of one of the magnets is reversed, so that the pair becomes attractive. In this case the position of zero derivative is the same as before, but now the signs of the derivatives are reversed. For larger separations $K_z$ is negative (unstable axially), while $K_r$ is positive (stable radially). For smaller separations the situation is again reversed, with the K values corresponding to axial stability and radial instability. Again, the novel use of different diameter magnet rings and the special choice of separation distance allows control over the axial force of attraction and its derivatives so as to, together with other elements, satisfy the previously stated requirements for positional stability of the-rotating body.

Figure 6A:
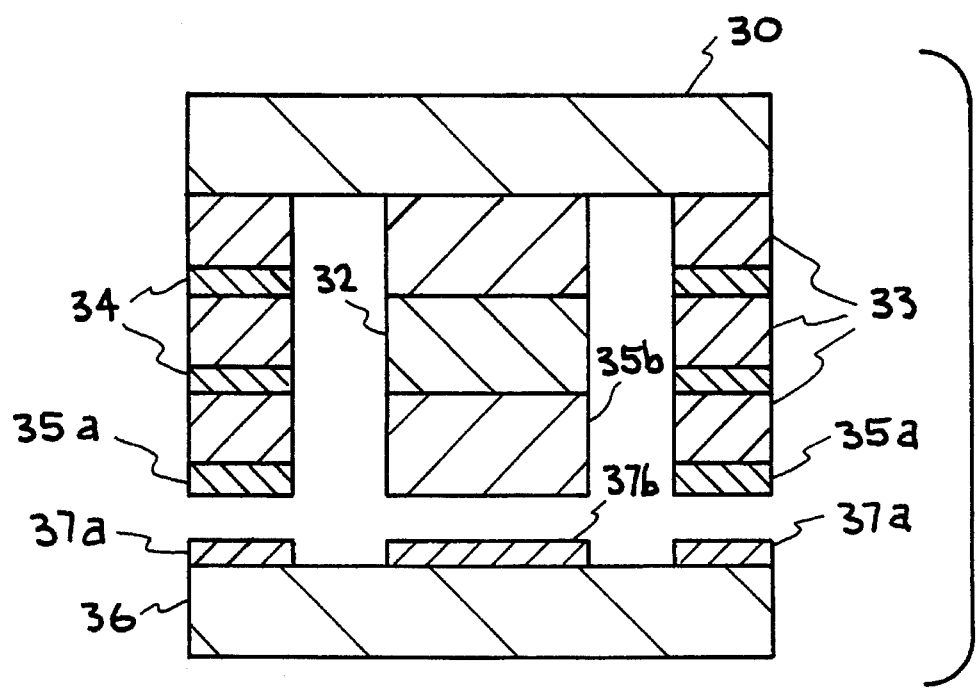
FIG. 6a is a cross-sectional side view of an axially symetric reduced derivative attractive magnetic bearing element.
Figure 6B:
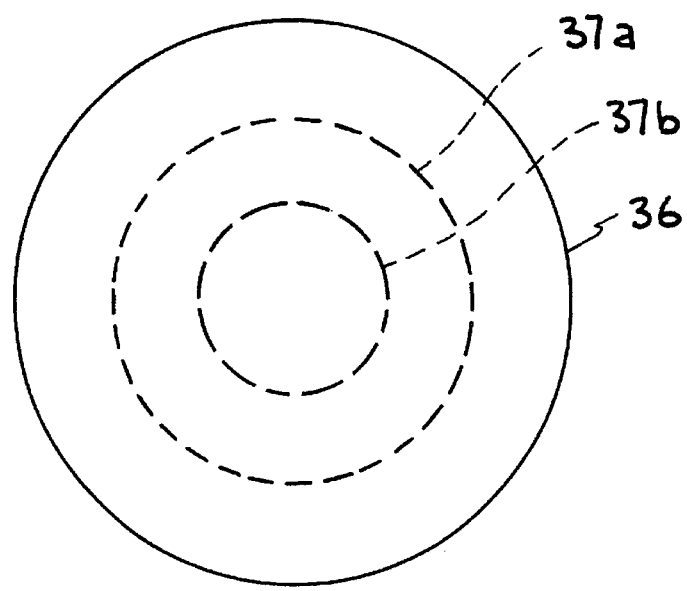

In the design of levitating magnetic bearings for use in the invention herein disclosed, and where it is desirable to utilize the flux-directing property of iron pole faces, novel design concepts which are herein claimed as a part of the invention, are needed. FIGS. 6a and 6b are a schematic view (in section) of an axially symmetric "reduced derivative" attractive magnetic bearing element. It is energized by a cylindrical piece of permanent magnet material 32, the flux from which is guided by iron structure 30 out to a cylindrical column made up of alternate washer-shaped pieces of soft iron 34 and spacers (gaps) 33. The spacers 33 are to be made either of non-magnetic material, such as aluminum, or a saturable magnetic material, such as ferrite. Lower element 36 is fabricated of soft iron and has pole faces 37a and 37b, also fabricated of soft iron. The attraction occurs between lower element 36 and the matching pole faces, for example pole faces 35a and 35b. FIG. 6b is an end view intended to show the circular nature of the bearing element. Because of the insertion of the gaps, the rate of change of flux with change in the separation between the upper and lower pole faces is much reduced, relative to what it would be without the gaps. It follows that the value of $K_z$ associated with the gap change is correspondingly reduced. As a result the overall requirements on the K values can be met under circumstances where it would have been impossible to meet them without the imposition of these "hidden" gaps.

Figure 7A:
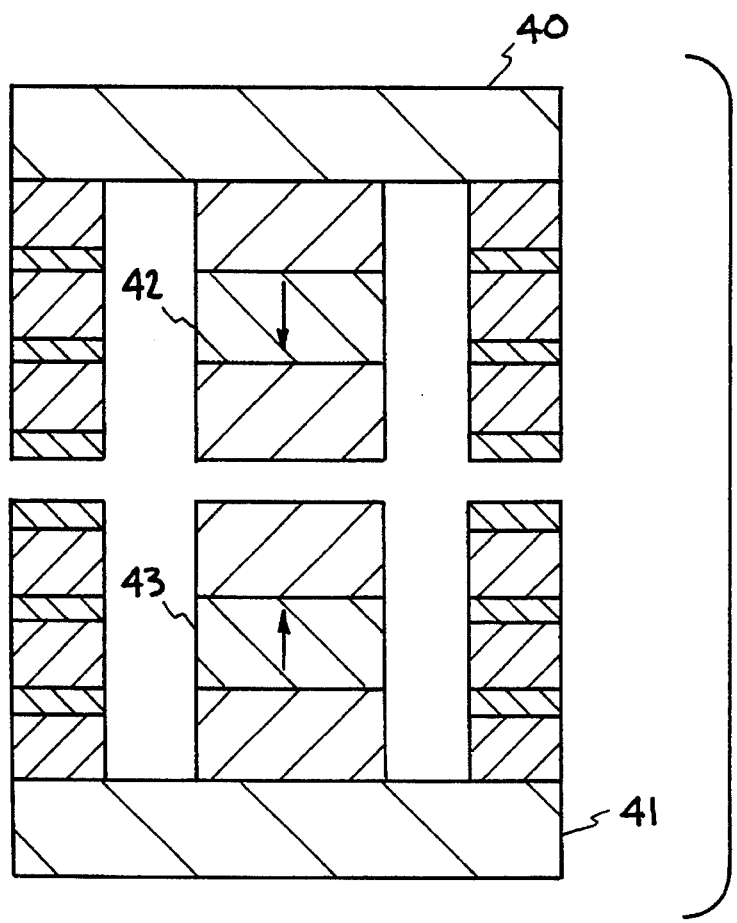
FIG. 7a is a side view in cross-section of a repelling-type magnetic bearing element.
Figure 7B:
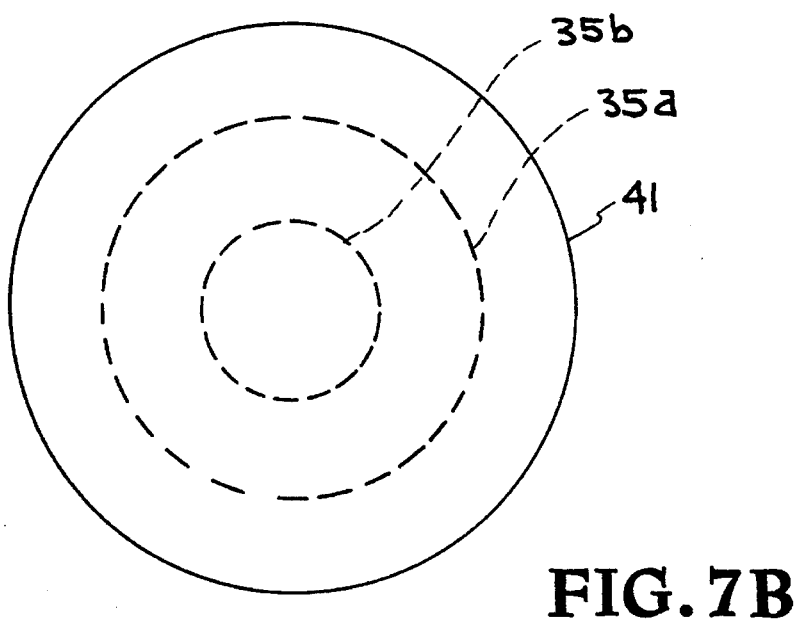

FIGS. 7a and 7b are a schematic view of a "reduced derivative", repelling-type, magnetic bearing element. Upper and lower poles 40 and 41 are constructed in the same manner, and are similar to the upper pole assembly shown in FIG. 6a. However the permanent magnet elements 42 and 43 are magnetized in opposite directions, as shown, so that repelling action occurs. While FIG. 7a is shown in section; FIG. 7b is an end view depicting the circular nature of the bearing element.

In the case of both of the elements just described, by adjusting the relative diameters and the dimensions of the alternating soft iron and spacers behind the pole faces, the force derivatives may be reduced further. However it will not be possible to deviate substantially from the 2 to 1 ratio between the magnitude of $K_z$ relative to $K_r$. Other elements, such as those about to be described must therefore be used to produce a bearing system that can satisfy equations [4] and [5].

In order to satisfy equations [4] and [5], it is necessary to utilize elements that have controllable force derivatives that deviate (in a favorable) direction from the −2 to 1 or −1 to 2 ratios, and are at the same time large enough in magnitude to overcome the destabilizing effects of these elements. The form of such elements claimed in this invention uses special slotted poles, energized by permanent magnet material, to accomplish this end. The use of these configurations allows the creation of bearing elements that have very strong negative force derivatives (positive K values) for displacements perpendicular to the face of the poles, while the force derivatives for displacements in the parallel direction are weak or negligably small.

Figure 8:
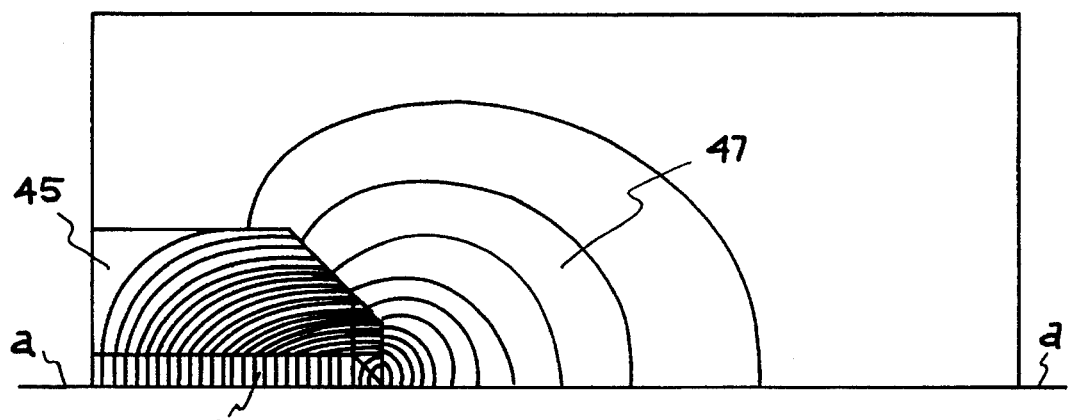
FIG. 8 shows the general configuration of the field lines in front of a slotted pole.

FIG. 8 shows, in cross-section view along a—a, the general configuration of the field lines 47 in front of a slotted pole comprised of iron pole face 45 and permanent magnet material 46. As can be seen, the effect of the slotted iron poles is to concentrate and intensify the magnetic field, which then decreases rapidly with distance away from the pole face.

In order for the magnetic field in front of the slotted pole to produce a force on another object that field must interact with currents, either equivalent Amperian in nature (as in magnetizable materials), or currents in a conducting region. Three different ways to employ the slotted-pole concept to achieve this end will now be described.

Figure 9A:
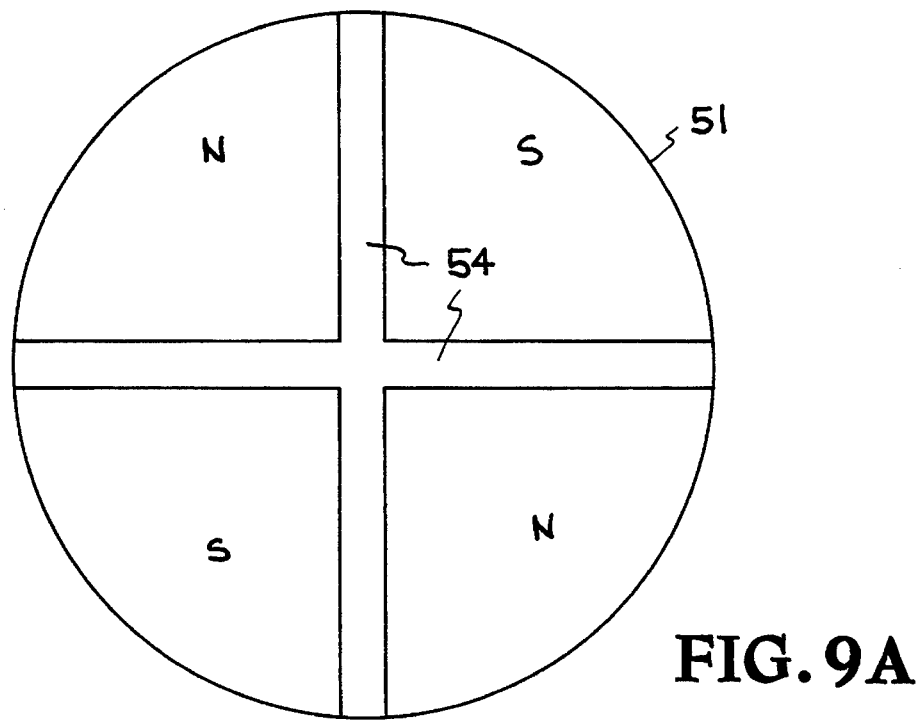
FIG. 9a is a top view of an embodiment of a slotted pole magnetic bearing element.
Figure 9B:
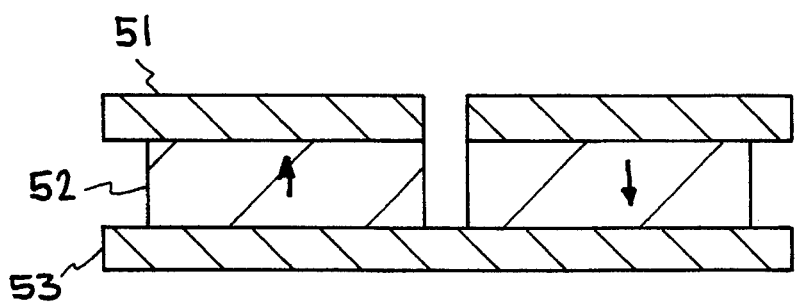

The first and simplest method is to locate a conducting surface, for example made of copper or aluminum, in front of the slotted pole, relying on the repelling force from eddy-currents that will be induced in that surface as the slotted pole moves, parallel to that surface, as a result of rotation of one element relative to the other one. In this way either axially directed repelling forces or radially directed (restoring) forces can be produced that can represent the stabilizing element in an otherwise unstable or marginally stable system. FIGS. 9a and 9b are a schematic representation of a slotted-pole magnetic bearing element, intended to be used with a nearby conducting plate, or with an array of inductive loops as described hereinafter. Soft iron pole faces 51 are energized by pie-shaped pieces of permanent magnet material 52, magnetized in the directions shown, to produce an intense magnetic field close to the slots 54 between the iron pole faces 51. A flux return path is provided by the circular soft iron piece 53. FIG. 9a is an end-on view of the top of the pole structure, while FIG. 9b is a side view of the various elements making up the pole structure.

Figure 10:
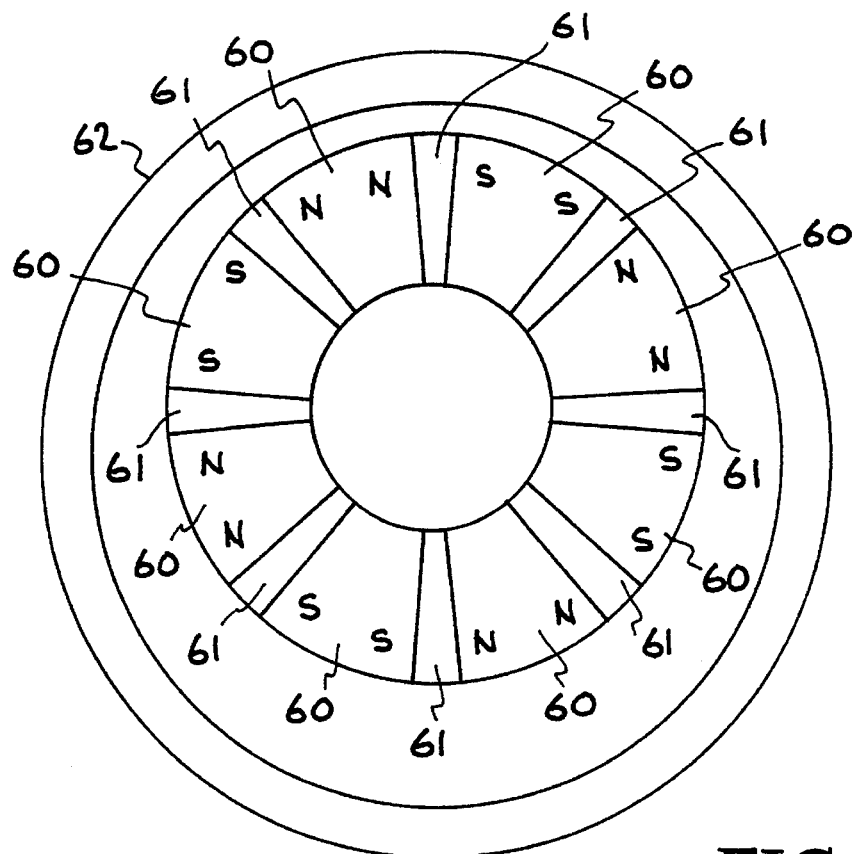
FIG. 10 is an end view of a cylindrical slotted pole assembly.

FIG. 10 is a schematic end-on view of a cylindrical slotted-pole assembly having soft iron elements 60 and permanent magnet material element 61 filled with permanent magnet material. The concentrated field appears accross permanent magnet material element 61. Relative rotation occurs between the pole assembly 60 and the conducting surface 62.

It is important to note that the requirements on the force derivatives represented by equations [4] and [5] do not necessarily imply the need for large forces to be exerted, only that the rate of change of the force should be adequately large. From the definition, $K=-[dF/dx]$ it can be seen that if the characteristic distance of the derivative is small, then it is possible to achieve a substantial value of K even if the force involved is small. Since the characteristic distance of the slotted pole geometry is approximately equal to the gap width of the slotted pole, the use of small enough gap widths should permit stabilization (i.e., the introduction of adequate amounts of positive K values in either the radial or the axial direction) without requiring that the eddy-currents in the conducting surface be unneccessarily large, with the accompanying large power losses.

Figure 11:
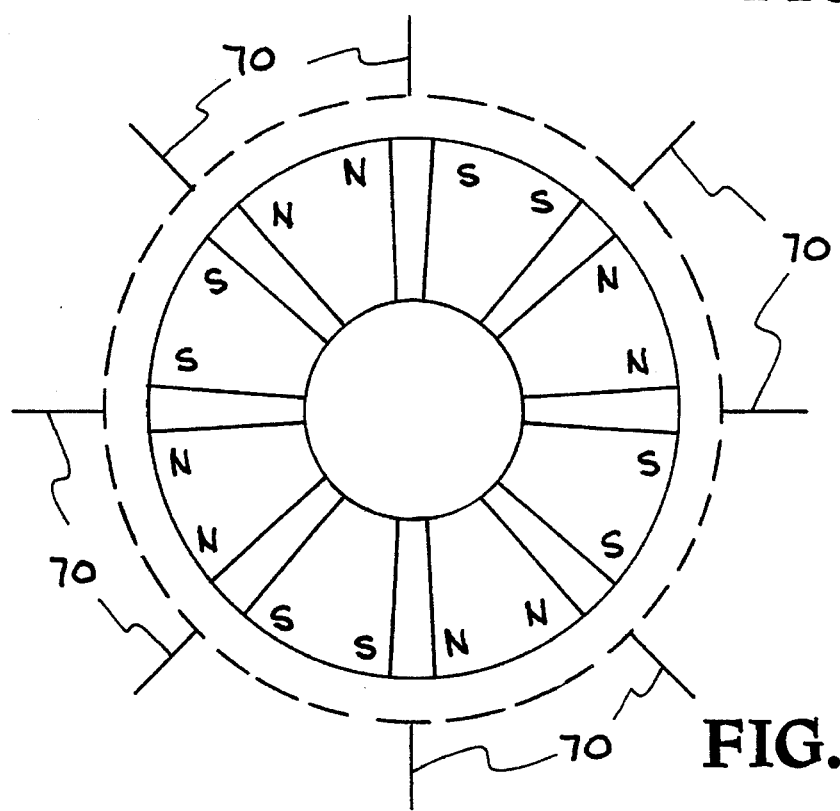
FIG. 11 is an end view of a cylindrical slotted pole assembly with an array of circuits.

The second, more energy efficient way, to employ slotted-pole exciters in order to generate stabilizing force derivatives is to replace the conducting surface with a surface composed of a multiplicity of conducting loops. FIG. 11 depicts schematically how the same slotted pole assembly shown in FIG. 10 could be used in conjuntion with a close-packed array of circuits 70. FIG. 11 is an end view of a close-packed array of circuits 70 having a cylindrical slotted-pole assembly with permanent magnet material element 61 filled with permanent magnet material, and soft iron elements 60. Relative rotation occurs between the pole assembly and the close-packed array of circuits 70. In operation either the inner pole or the outer assembly could be rotating, depending on the application. These loops appear as an assembly of window-frame-like conducting loops, either single- or multiple-turn, using, for example, litzendraht wire to reduce high-frequency losses. As the field from the slotted-pole exciters passes by these loops, currents will be induced in them. These induced currents will in turn interact with the transverse component of the magnetic field from the slotted poles to produce a repelling force for relative displacements perpendicular to the surfaces.

Figure 12:
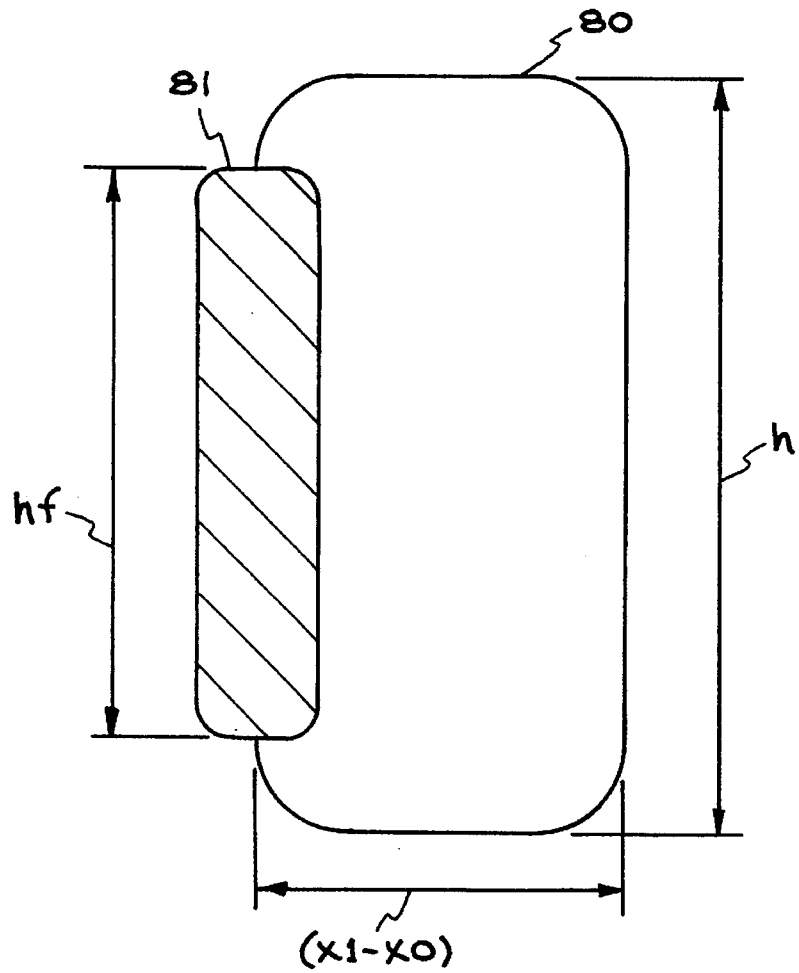
FIG. 12 is a partial cross-section side view of an inductive loaded circuit.

The advantage of using loop circuits instead of a conducting surface to produce strong positive K values lies in the reduction in the power losses that can be achieved, as follows: The force between the slotted poles and the conductors depends on the product of the current induced and the transverse component of the magnetic field from the poles, at the conductor. However, the power dissipated by the conductors varies as the square of the current flowing in the conductor and inversely as the area of the conductor. Thus by taking advantage of flux concentration effects in the slotted poles (increasing the magnetic field), while at the same time using inductive effects to decrease the current flowing in the conductors, the product of magnetic field and current (thus the force) can be kept approximately the same. In this way it is, for example, possible to reduce the power losses associated with generating a given force or force derivative by about two orders of magnitude, relative to that associated with the employment of eddy currents in conducting surfaces. To accomplish this end the back legs of each of the loop conductors is "loaded" with ferromagnetic material in the form of laminated magnetic material or ferritic materials. FIG. 12 is a schematic side view of an inductive loaded circuit, an array of which might be used in a bearing element such as shown in FIG. 11. Wire circuit 80 (which might be made up of many turns of a wire conductor shorted together) threads through a cylinder 81 of "soft" magnetizable material, for example ferrite. Shown also on the figure are the parameters used in the theoretical expression for the force exerted on such circuits. The effect of this loading is both to decrease the current to its desired value, and to reduce the deleterious effects of mutual inductance between adjacent circuits. In the absence of this loading the effect of mutual inductance would be to perturb the currents induced in each circuit in an unfavorable direction.

Figure 13:
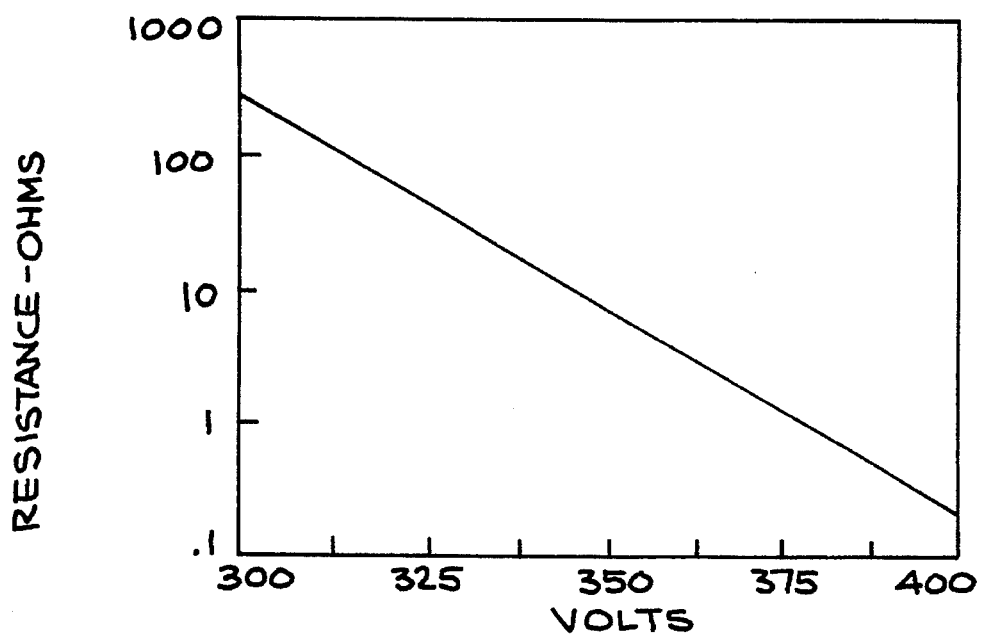
FIG. 13 is a graph of the variation of resistance with applied voltage for a typical commercial surge suppressor resistor.

In those situations where it is necessary to enhance the steepness of the force derivative beyond that readily achievable by control of the slot width of the slotted poles a novel variation of the "loaded circuits" described above can be employed. If one replaces some or all of the inductively loaded circuits by circuits that are terminated in special non-linear resistors (or resistive material such as silicon-dioxide) of the general type used in "surge suppressors" the steepness of the variation of force with approach of the slotted pole system to the circuit array can be greatly enhanced. FIG. 13 shows graphically the exponentially rapid variation of the resistance with applied voltage of a typical commercial surge-supressor resistor made of this material. As can be seen, over the midrange of the plot, a twenty percent variation in voltage leads to a change in resistance by three orders of magnitude.

Figure 14:
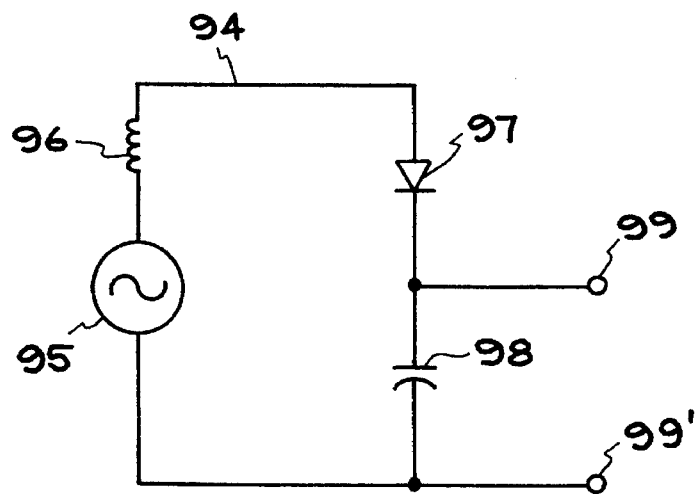

FIGS. 14b and 14c depict schematically two possible forms for a magnetic bearing element where large values of the force derivative are obtained by employing non-linear resistive material. FIG. 14b is a side view and FIG. 14c is an end view of one inductive circuit, an array of which would be used in the manner shown in FIG. 11. Element 90 is a rectangular circuit made of conducting material (strips or parallelled wires). The rear elements of the rectangular circuit, that is, the sides that are behind the side that is closest to the slotted pole assembly, are bonded as shown to non-linear resistive material 91, thus closing the circuit electrically. The resistive element 91 could either be continuous, as shown, or be made up of discrete resistors. Similarly, the window-frame-like circuit elements could be a single turn or could be multi-turned, depending on detailed design considerations having to do with the properties of the non-linear resistive elements as they relate to the voltage generated in the circuit. Owing to the exponentially changing nature of the resistance element, the current in the conducting circuit will increase correspondingly rapidly, thus leading to a very large force derivative. It follows that it is also possible to use this principle to design a system with a low force derivative (and low losses) when the separation is larger, as in normal operation, but have the force and its derivative increase very rapidly under dynamic situations (shock loads in a vehicle, for example), thus providing strong "snubbing" forces without physical contact between the rotating and the stationary parts.

FIG. 14a is an alternative, simpler structure, that could be used in those circumstances where the induced electric field from the relative motion of surface layer 92 with supporting material 93 and the slotted pole assembly (not shown) is sufficiently high to induce appreciable currents in the continuous surface layer 92, of non-linear resistive material, bonded to supporting material 93 (either conducting or non-conducting in nature, depending on design requirements). When the axes of the slotted pole and surface layer 92 are coincident, the currents induced could be limited to small values. Upon relative displacement of the axes, such that the slotted pole approaches surface layer 92, the induced currents in the non-linear resitive material could rise to high values, thus greatly increasing the repelling force between surface layer 92 and the slotted pole.

In addition to the use of nonlinear resistive material in the circuits as a method of increasing the magnitude of the force derivative in elements such as the one shown in FIG. 10, other types of nonlinear elements could be employed. For example, the resistive element shown in FIGS. 14a–14c could be replaced by the combination of a solid-state rectifier diode connected to a source of fixed dc voltage, shown as an equivalent circuit in FIG. 14d having conducting wire 94, alternating current 95, inductor 96, diode 97, capacitor 98 and voltage source terminal 99. The lower terminal 99' of this source would then be used to complete the circuit by connecting it to the other terminal of the circuit. All of the other circuits in the array would then also employ series diodes, connected in the same manner to the common voltage source. In operation no current would flow in the circuits until the peak of the ac pulse wave put out by that circuit exceeded the voltage represented by the sum of the source voltage and the diode turn-on voltage (a few tenths of a volt). If the biasing voltage from the external source were, by design, arranged to be high compared to this turn-on voltage, the force derivative would be increased, as follows: For those circuits that were approached by the slotted-pole assembly (as a result of a transverse displacement) there would result a rapid increase of the circuit currents whenever that displacement resulted in the generation of a voltage pulse the peak value of which exceed the bias voltage (as corrected for the diode turn-on voltage). This bias voltage could be varied appropriately, as needed to optimize the force derivative for the application at hand, or else to compensate for changes in the peak voltages generated caused by changes in rotation speed.

What has been just described is an alternative passive electronic means for increasing the force derivatives, beyond those attributable to geometric effects, for bearing elements of the types depicted in FIGS. 9a and 9b, 10, 11, 14a–14c, 17a and 17b, 18, 19, and 20.

The third method for using slotted-pole exciters to produce an element with strong positive K values for displacements perpendicular to the surface of the exciters is to use two such exciters that face each other. Depicted schematically in FIGS. 15a and 15b are the two components in an axial repelling-type magnetic bearing element using opposing slotted poles. Assembly 100 is made up of a series of slotted poles 101 (or slabs of permanent magnet material magnetized transversely). The opposing assembly 102 is comprised of an annular slotted pole 103 (or a thin cylinder of permanent magnet material magnetized radially). Either assembly may rotate with respect to the other one in order to achieve azimuthal time-averaging of the repelling force between them and of the lateral force resulting from a sideways displacement of their axes. The exciters are designed so that their slots do not lie exactly parallel to each other, whatever the azimuthal position of one exciter relative to the other one. In this way repulsive forces are still exerted between the surfaces, but the force derivative for displacements parallel to the surfaces is weakened relative to the force derivative for displacements perpendicular to the surface. When used in combination with circular-pole elements, a bearing system satisfying equations [4] and [5] becomes possible.

If the surface of one or both of the exciters is conductive, then the eddy currents produced will augment the mutual repulsion of the slotted poles, thus increasing the K values for perpendicular displacements, while not contributing to the K values for displacements parallel to the surface. If the surfaces are not conductive (ferrite or powdered-core material, for example) then repulsive forces can be generated without accompanying eddy current losses.

In addition to the use of slotted poles made of "soft" magnetic material, energized by permanent magnet material, it should also be apparent that the desired results can be obtained by using rectangular slabs of permanent magnet material. In this case the upper edges of this material produce fringing fields closely resembling those produced by the slotted poles. If, in addition, the permanent magnet material is ferritic in nature, its resistivity will be very high, thus suppressing the generation of eddy currents with their associated power losses.

It is required for the bearing system described in the invention to operate successfully that mechanical or other means be provided to maintain stability when the rotating element is at rest, or when rotating below a low critical speed determined by the design. To accomplish this end various elements can be used, whereby centering elements act below a critical speed, and are thereafter disengaged, for example by centrifugal action. A centrifugally disengaging mechanical bearing is shown schematically in FIG. 16. It is comprised of an outer (rotating) element 110, spring elements 111, and retainer quadrants 112. Retainers 112 remain in contact with the outer race 113 of a ball bearing, the inner race 114 of which is non-rotating and which is held in position by shaft 115. As shown, a ball bearing acts on the rotating element at zero or slow speeds, and then is disengaged by the action of spring-like elements 111 that expand under the influence of centrifugal forces. Other means for achieving this end will be apparent to those skilled in the art. As a part of the present invention, it should be recognized that disengaging mechanical elements of the type described can have a dual function. They not only can function to maintain stability while the rotating element is spun up from zero speed, but if properly designed, they can act as "backup" bearings to accomodate momentary accelerations such as from seismic effects (in stationary systems) or road shocks in mobile systems.

In the elements described in the preceeding sections will be used, in some cases with already known elements, to levitate a rotating system that is maintained in a state of dynamic equilibrium without the use of active feedback circuitry. An important facet of the novelty of the invention lies in the fact that the avoidance of the instability predicted by Earnshaw's Theorem comes about by a combination of satisfying, for the system as a whole, some well-defined stability criteria, together with the employment of dynamic effects. That is, the system is passively stabilized above a low critical speed. Below this speed conventional elements, such as ball bearings, are used to maintain stability, with centrifugally activated means provided to disengage these mechanical elements for speeds higher than the critical speed.

Practical achievement of the objectives toward which this invention is aimed requires three critical steps: The first of these is to choose from among the specific bearing elements that have been described the set which is to be used in the contemplated application. That is, bearing elements must be chosen which, when taken together, are capable in principle of satisfying the stability requirements contained in equations [4] and [5]. For example, if two (only) magnetic elements are to be employed, and if one of the elements is intrinsically stable against radial displacements, but not against axial displacements, then it must be paired with another element that provides, over a finite range of displacements, a sufficiently large negative axial force derivative to overcome the unstable axial force derivative of the first element. The pair then could be used, for example, to support a rotor pendulously. Alternatively, they could be used together with other compatible elements (i.e. with compatible force derivatives) to levitate a rotating object where levitating forces are being provided at both ends.

The second required step in the design of a practical implementation of the invention is, either by analytical or computational means, or by consulting previously compiled design tables, to design the chosen elements so that their force derivatives are, taken together with the other elements, compatible with the requirements of equations [4] and [5].

The third step is to include a disengaging mechanical bearing element in the design, one that will maintain stability as the rotor is spun up from rest, until the critical speed where the magnetic elements, alone, provide stability. Alternatively, instead of using a disengaging mechanical element to accomplish this end, in some circumstances it might be preferable to use a temporarily activated servo-type system of the general type used in commercial magnetic bearing systems. In this case the servo system would be activated only during start-up, but then would be turned off as soon as the critical speed where the passive elements took over was reached. For rotating systems that would normally be operating continuously, their performance would in this way not be dependent on the reliability of the servo system, nor would there be continued power losses associated with this system, since it would be turned off during normal operation.

The methods of analysis of the force derivatives of the various elements that are a part of the invention are outlined here to illustrate the concepts involved. The means by which specific cases are evaluated will then be apparent to those skilled in the art.

First, to evaluate the forces and force derivatives between two annular permanent magnets the following methods may be applied.

The magnets may be replaced conceptually with circular sheet currents (the Amperian current equivalent of permanent magnet magnetomotive force). Analytical methods or computer codes may then be used to determine both the forces and their derivatives. The curve shown in FIG. 3 was determined by analytical evaluation of the Biot-Savart law of electromagnetic theory.

To determine the forces produced by the slotted-pole eddy-current exciters described above, similar methods can be used. A simple analytic fit to the forces produced can be obtained by evaluating the constants in the representation given below:

$$F_z = [1/8\pi] \times 10^7 [B_0]^2 \left\{ \frac{1}{1+z/d} \right\} dh \text{ Newtons/slot,} \quad [6]$$

where d (m.) is the width of the slot, h (m.) is its length, and $B_0$ (Tesla) is the strength of the magnetic field at the plane of the slot (z=0). A close fit to actual cases can be obtained by adjusting "d" empirically. However, assuming "d" to be exactly equal to the slot width will not result in large errors. Similarly, a good fit to the force derivative may be obtained by differentiating equation [6].

As a specific example of forces and force derivatives as calculated using equation [6] consider the following example:

d=0.005 m., h=0.05 m., z=0.001 m., $B_0$=2.0 Tesla.

The calculated force per slot is then $F_z$=1.66 Newtons, and the force derivative (per slot) is $dF_z/dz$=−276 Newtons/meter. Though the force is not large, the value of the force derivative is quite high, owing to the narrow slot dimension (which sets the scale of the force derivative). If the slotted-pole assembly has many slots the magnitude of both the force and the force derivative would be increased correspondingly.

Using a similar analytic representation for the variation of magnetic field with distance from a slot, an analytic evaluation of the force produced between a pole slot and one of the conductors of the inductively loaded repelling element. The analytical form derived can then be compared with an actual model in order to permit empirical adjustment of the parameters to improve the accuracy of the expression. The theoretical expression for the force per conductor is given by:

$$F_z = 2.5 \times 10^6 [B_{max}]^2 \left[ \frac{hd}{1+z/d} \right] [h/h_f] \left\{ \frac{\ln\left[\frac{1+(z_1/d)}{1+(z/d)}\right]}{\mu \ln(b/a)} \right\} \text{ Newtons}$$

Here $z_1$ is the distance from the face of the slotted pole to the back leg of the "window frame" conductor loop, $h_f$ is the length of the ferrite jacket (or transformer iron laminations) on that back conductor, b/a is the ratio of outer to inner radius of that jacket (assumed circular in cross-section), and $\mu$ is the permeability of the jacket. Other symbols are as before.

Using this expression both the force and its derivative can be evaluated (by differentiation for the force derivative). When combined with an analytical expression for the power loss per conductor an optimized design may be obtained, one also consistent with the requirements of equations [4] and [5], when the other bearing elements are taken into account.

In summary, either by use of empirical testing, by analytical forms, or by computer codes, the forces and force derivatives of the various elements of the magnetic bearing systems of this invention can be designed and constructed, with the assurance that dynamical stability against positional displacements can be achieved.

Figure 17A:
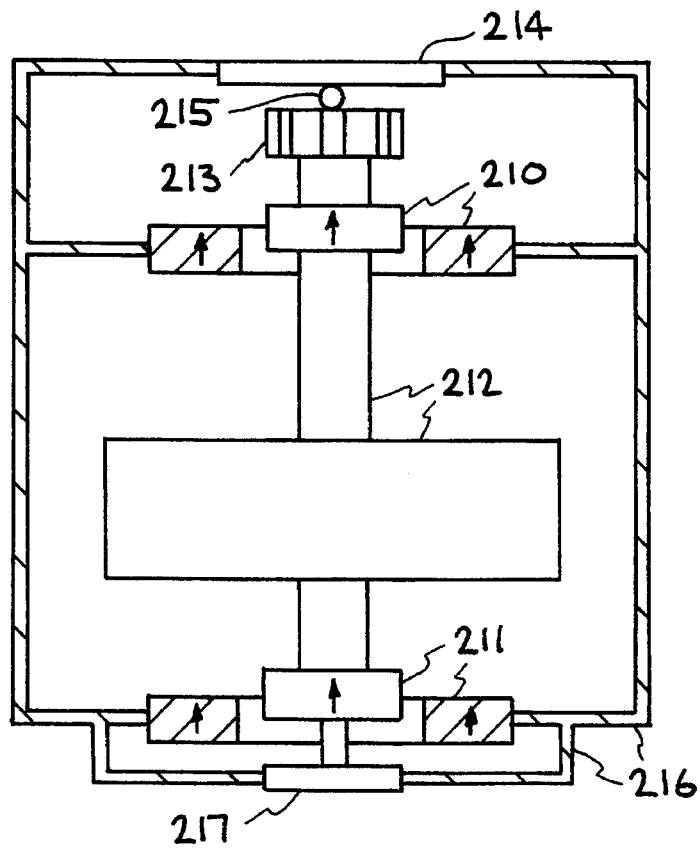
FIG. 17a is a side view of a three element magnetic bearing system with axial stabilization.
Figure 17B:
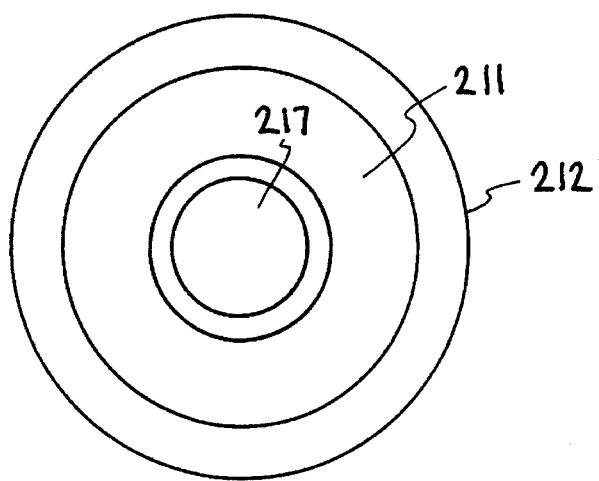

One embodiment described herein achieves stability by using three elements to accomplish the requirements of equations [4] and [5]. Two of these elements consist of radially stable ($K_r>0$), axially unstable ($K_z<0$) elements, and the third provides axial stabilization only, in an amount to overcome the negative $K_z$ component of the other two elements. In FIGS. 17a and 17b, a simple form of this embodiment is shown schematically and in section. Element 210 is made up of an outer, annular, permanent magnet and an inner disc-shaped permanent magnet. Both magnets have the same sense of magnetization (upward in the example), and the inner magnet is displaced slightly upward from the plane of the outer magnet, so that both upward forces (balancing the force of gravity on the rotor and shaft assembly, 212), and radially stabilizing forces are exerted. At the top of the assembly there is shown an eddy-current-actuated assembly, consisting of a slotted pole face, 213, as illustrated in FIG. 9a, and a conducting plate, 214. The number of slots, their lateral dimensions, and the amount of exciting permanent magnet material are adjusted so that the (stabilizing) spring constant of the eddy-current assembly is larger in magnitude than the (destabilizing) spring constant of the bearing elements 210, taken together.

Shown also in FIG. 17a is a simple example of a disengaging mechanical element (a ball 215) that preserves stability at zero or low speeds, where the eddy-current stabilizer is inoperative or weak in action. As the rotor speed increases, the axial force exerted by the eddy-current stabilizer will build up to the point where it will push the rotor-bearing assembly downward, thus disengaging the mechanical stabilizer. Shown in FIG. 17a are radial damper 217 that may be required to suppress vibrations at special critical speeds, or "whirl" instabilities resulting from mechanical hysteresis or other sources. Support member 216 is fixedly connected to conducting plate 214, redial damper 217, element 210 and element 211.

While the embodiment shown uses simple ring-shaped magnets and an eddy-current stabilizer to achieve a stable state above a critical speed, the invention also includes other combinations of elements to produce the same result. For example, the reduced-derivative radially-stable bearing element shown in FIG. 6a could be substituted for one or both of the annular-ring bearings shown in this figure, and the axial stabilizing element employing opposing slotted poles, shown in FIG. 15a, could be used in place of the eddy-current stabilizer shown here. As long as the elements taken together satisfy equations [4} and [5} above a critical speed, the objective of the invention can be satisfied.

Figure 18:
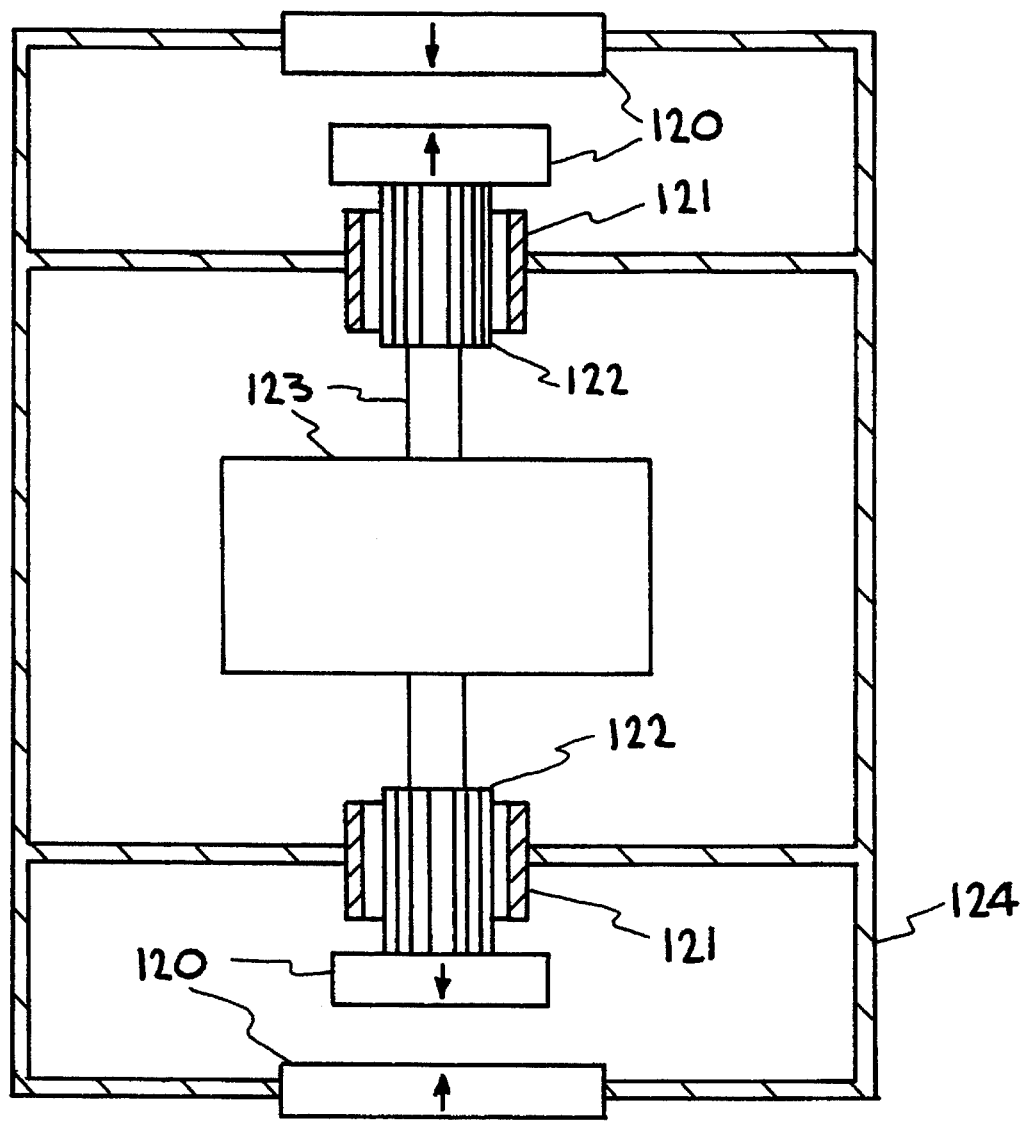
FIG. 18 shows a four element magnetic bearing system with radial stabilization.

Another embodiment uses four elements to achieve both axial and radial stabilization above a critical speed. In FIG. 18, a simple version of this system is shown schematically and in section. Elements 120 are simple repelling elements made up of two disc-shaped permanent magnets. The lower of these elements is sized so as to be able to support the weight of the rotor and shaft 123, plus the weight of the other rotating parts, and in the presence of a downward-acting force from the upper bearing, so that the system as a whole possesses an equilibrium that is stable against displacements that are parallel to the axis of rotation (up or down in the figure). Elements 120 are unstable against radial displacements, so that stabilizing means are required, provided by the elements 121 and 122. Support member 124 rigidly holds element 120 and element 121. Shown is a slotted pole 122 (side view) and a thick-walled conducting cylinder 121. The slot dimensions, the number of slots, and the amount of permanent magnet material used to generate the field is to be varied so that above a low critical speed the (positive) $K_r$ value of the eddy current stabilizers overcomes the (negative) $K_r$ values of the other two elements, so that both axial and radial stability are achieved.

While the embodiment shown in FIG. 18 utilizes only simple disc-shaped magnets for its levitating forces, and a radial eddy-current element for radial stabilization, it should be appreciated that other combinations, coming within the scope of this invention, could be used. For example, reduced-derivative repelling elements, such as those shown in FIG. 7a could be used to provide levitation, and opposing slotted poles or a slotted pole used in conjuction with an array of inductive circuits could be used to provide radial stabilization.

Not shown in FIG. 18 are the centrifugally disengaging mechanical elements (such as exemplified by FIG. 16) needed to maintain stability at zero or very low speeds, while the rotor is being brought up to operating speed. Also not shown are any vibration dampers required to overcome rotor-dynamic instabilities that may occur in some systems.

Figure 19:
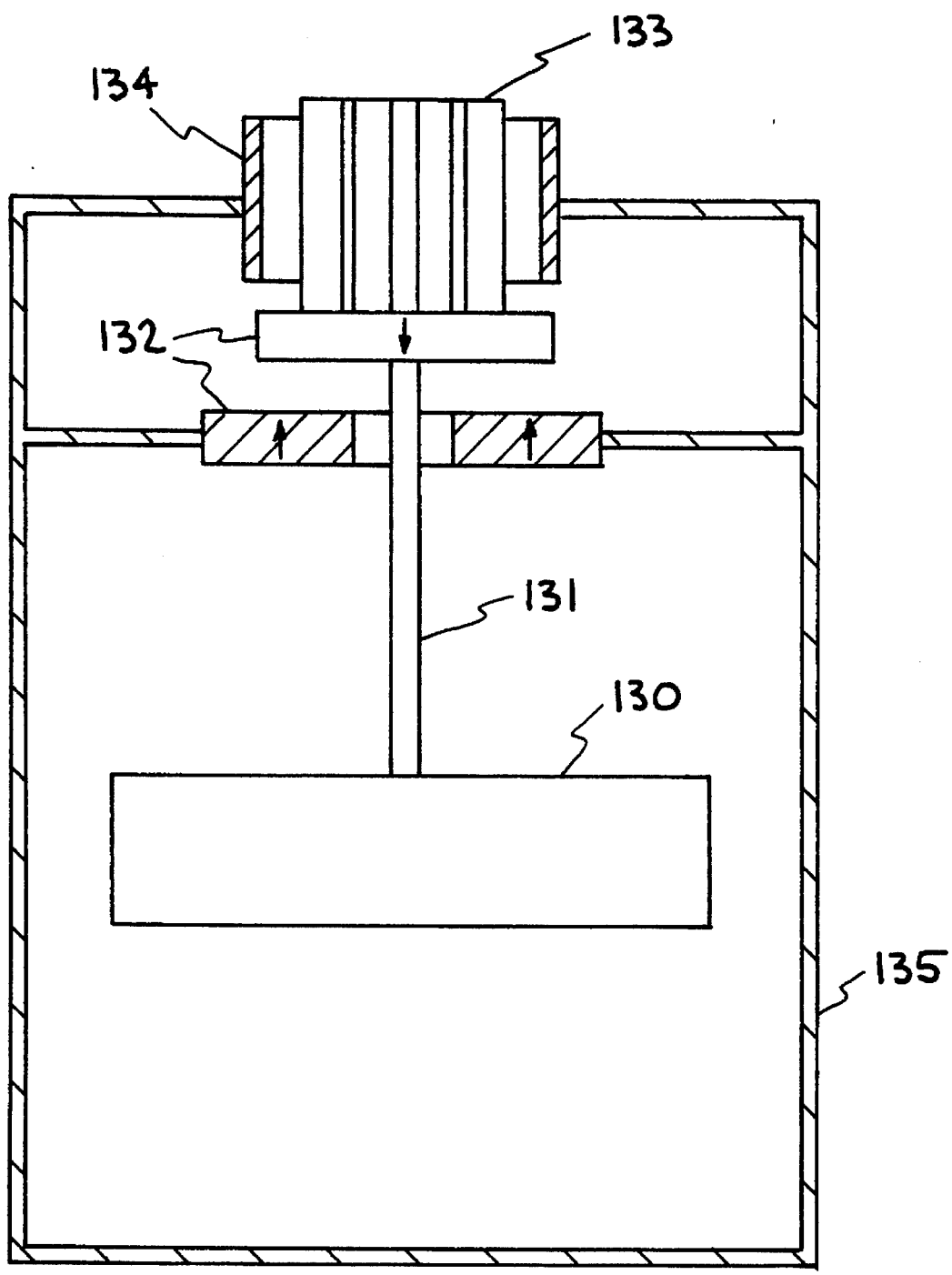
FIG. 19 shows a two element magnetic bearing system utilizing the force of gravity for tilt stabilization.

In some situations it may be valuable to utilize the force of gravity to suppress "tilt" instabilities, while counting on the magnetic bearing system only to provide stability against pure transverse or pure longitudinal displacements. As shown in FIG. 19, the rotor and shaft 130, 131, are hung pendulously from the repelling bearing element 132, which represents a system stable against axial (vertical) displacements. To overcome the radially destabilizing force of the the bearing element 132, a radial eddy-current stabilizer, 133 and 134 is shown, in which a slotted pole (side view) 133, rotates inside a conducting cylinder 134 (shown in section). Support member 135 rigidly holds element 132 and element 134. The number of slots, their width, and the amount of energizing permanent-magnet material in the slotted pole is adjusted so that the (positive) $K_r$ value of this element overcomes the (negative) $K_r$ value of the levitating element, while contributing little or no $K_z$ component.

Although FIG. 19 shows a particular version of this embodiment it should be understood that other combinations of elements as described in this invention could be used. For example, elements 132 could be replaced by a reduced-derivative repelling bearing element as shown in FIG. 7a. Also, the eddy-current radial stabilizer could be replaced by an opposing-slotted pole version, as shown in FIG. 15a.

Not shown in FIG. 19 is a centrifugally disengaging bearing element needed to preserve stability at zero or low speeds. Also not shown are any dampers required to maintain stability against rotor-dynamic effects, such as whirl instabilities.

In common with other embodiments described in FIGS., 17, 18, and 20, the embodiment shown in FIG. 19 has a lower critical speed below which it must rely on other means, such as a mechanically disengaging mechanical bearing, or a temporarily acting servo/electronic system, to maintain stability against displacements from the equilibrium position. In the embodiment of FIG. 19 this lower critical speed would be the one when the radially stabilizing force derivative from the bearing element represented by the slotted-pole 133 and conductor 134 exceeds the radially destabilizing force derivative of the magnetic bearing element 132. Above this speed the stabilizing element would always be able to overcome the destabilizing element, so that stability against transverse displacements would persist at higher speeds than the critical speed.

An approximate means for estimating the critical speed for this embodiment would be to ascertain at what speed the speed-dependent effective frequency of the magnetic pulses appearing at the surface of the conductor exceeded that frequency where the skin depth in the conducting shell 134 became less than the thickness of that shell. At all rotation frequencies higher than that frequency the force derivative would remain approximately constant. A simple equation that gives this criterion in terms of the radial thickness of the shell, t(m), (assumed made of copper), of the rotation speed f (Hz), and the ratio of the slot width, d (m), to the radius of the slotted pole, a (m)., is the following:

$$f > 4.4 \times 10^{-3} (d/a)(t)^{-2} \text{ Hz.}$$

As an example, take a=0.05 m., d=0.001 m., t=0.005 m., finding $$f > 3.5 \text{ Hz} = 210 \text{ RPM.}$$

Above this rotation speed the skin depth would be less than the thickness of the conductor so that the repelling force would approach its limiting value (i.e. its value at high rotation speeds).

In a similar manner it is possible to derive theoretical expressions for the critical speeds of other forms of the magnetic elements that rely on induction effects, for example the form shown in FIG. 11.

The magnetic bearing systems that have been described have all required a minimum of three elements, i.e., two magnetically excited elements and one disengaging mechanical element, for their operation. However, there are systems coming under the purview of the invention that require only two basic elements for stability about the point of equilibrium one magnetically activated one, and one disengaging mechanical element. The embodiment described herein falls in that class. It is based on the use of the eddy-current actuated and/or the inductively excited concepts depicted in FIGS. 9a, 10, 11, 12, 13 and 14a. In these cases, where the repulsive forces are due to interactions between a magnetic field and currents induced by relative motion between a conductor and that magnetic field, the assumption of static fields implicit in the derivation of Earnshaw's Theorem are not satisfied, so that its conclusions with respect to stability do not apply.

Figure 20:
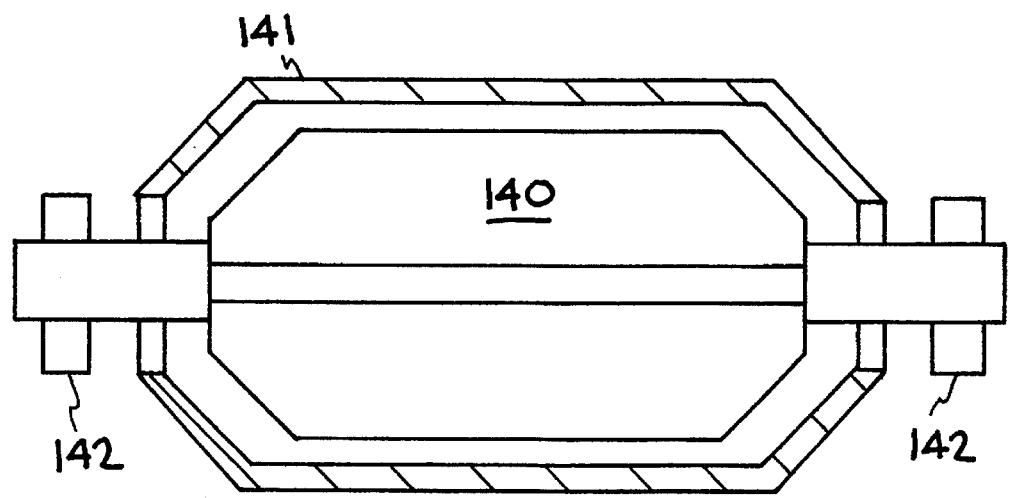
FIG. 20 shows a two element magnetic bearing system.

FIG. 20 shows a simple example of a horizontal-axis "journal" type of magnetic bearing system based on this concept. As shown, the system is made up of three components, specifically: a cylindrical slotted pole 140, that rotates within a conducting surface 141 (or an array of circuits such as shown in FIGS. 9a or 10), and, a pair of mechanically disengaging bearings 142 (one at each end) that keep the rotating parts centered mechanically until the speed reaches a sufficiently high value for electromagnetic forces to take over and provide a levitating and centering force on the rotating element.

As shown in FIG. 20, both radial and axial stabilization are attainable in this situation, achieved by making the rotor taper at its ends so that there exist both inwardly and axially directed forces in these regions. Other variations, including the use of barrel-shaped surfaces, and/or a rotor with slots both on its cylindrical surface and on its two ends (facing conductors) will be apparent to those skilled in the art.

For those situation, such as high-speed machining spindles, where it is important to achieve as high as possible a value of the radial force derivative, some or all of the inductive circuits may contain non-linear resistive material, such as is shown in FIG. 14a. Alternately, circuits having biased diodes may be utilized.

It is apparent that the proposed configuration can be implemented either with a rotating slotted pole exciter having a stationary conductor system, or with a stationary slotted pole exciter having a rotating conductor system, depending on the application. Since the forces generated depend only on the existence of relative motion between the magnetic system and the conductor system, either may rotate relative to the other one. Correspondingly, either element may be outside of the other one, depending on the particular needs of the application. Similarly, the elements may be "bowl-shaped" in order to sustain a rotating element with a vertical-axis orientation against the force of gravity.

As with any rotating system, it may be required to use vibration dampers to insure a stable transition from low speed to the operating speed range. For simplicity such dampers are not shown in FIG. 20.

Figure 21:
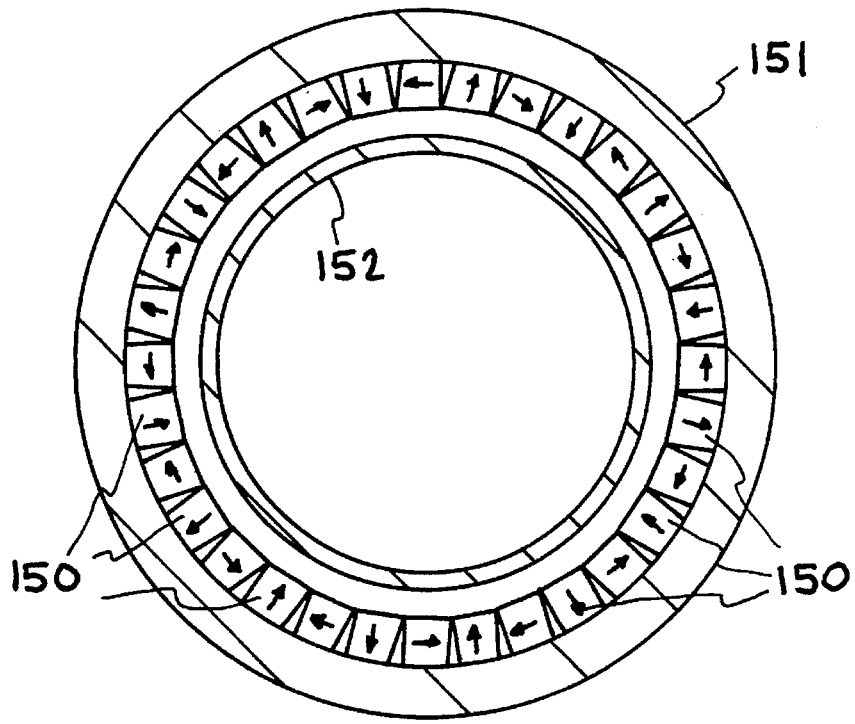
FIG. 21 shows an outer cylinder having permanent magnets and an inner conducting cylinder with portions in cross-section.

An alternative method of creating a concentrated magnetic field with a configuration resembling the slotted pole system is shown in FIG. 21. This configuration uses only permanent magnet bars 150 to create the magnetic field. Field concentration is achieved in this configuration by arranging the magnets with the directions of magnetization as shown. In this assembly there is no need for iron pole faces. The magnet bars 150 are held in place by the cylinder 151, composed of non-magnetic material. Inside the magnet array is shown a conducting cylinder 152 within which the eddy currents are generated. Alternatively, an array of circuits of the general type shown in FIGS. 11a, 11b and 12 could be used in place of the conducting cylinder.

In FIG. 21, it is to be understood that either the magnet array 150 or the cylinder 152 could be rotating with respect to the other element. Also, it should be understood that the position of cylinder 152 and the array 150 could be inverted with respect to each other. That is, the magnet array could be inside the cylinder, with its magnetic field facing outward toward the conducting cylinder.

Figure 22:
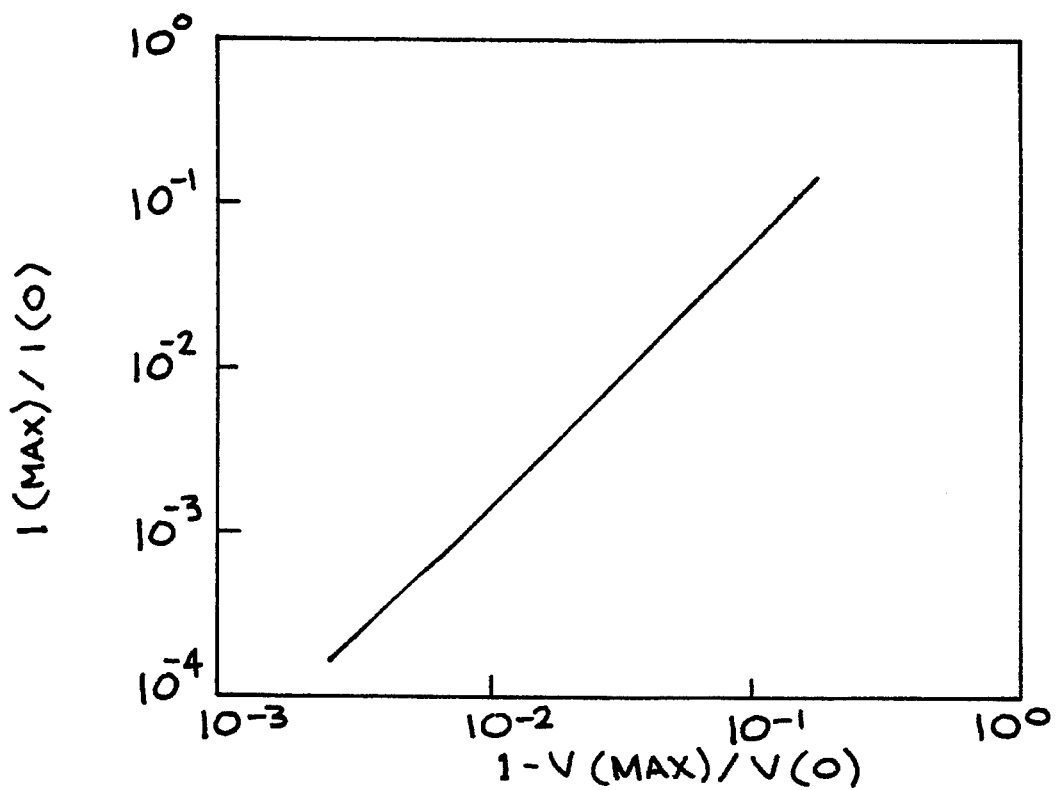
FIG. 22 is a plot of the calculated peak induced current versus 1 minus V(max)/V(0).

FIG. 22 is a plot of the calculated peak induced current (normalized) vs the quantity $[1-V_{max}/V_0]$, where $V_0$ is the magnitude of the bias voltage, and $V_{max}$ is the peak value of the induced voltage. The repelling force is proportional to the normalized peak induced current, $I_{max}/I_0$. As can be seen, this force can be made to be very sensitive to small changes in $V_{max}$ when the bias voltage approaches the peak generated voltage, $V_{max}$. Conversely, the magnitude of the force derivative may be varied by controlling the bias voltage, either manually or through a feedback circuit.

Changes and modifications in the specifically described embodiments can be carried out without departing from the scope of the invention, which is intended to be limited by the scope of the appended claims.

I claim:

1. An apparatus comprising:

at least one rotating member having a central axis of rotation;

non-superconducting magnetic means for stabilization of said rotating member above a critical angular velocity, wherein said magnetic means comprise a plurality of elements comprised of stationary and co-rotating parts, said elements having force derivatives of such magnitudes and signs that they together satisfy the requirement that;

the negative of the sum of the time averaged derivatives of the force exerted between said stationary and said rotating part of each element in the axial direction is greater than zero;

the negative of the sum of the time averaged derivatives of the force between said stationary and said rotating part of each element in the radial direction is greater than zero; and the sum of the vertical forces exerted by the stationary elements on the rotating elements is at least equal to the force of gravity on said rotating elements and any other co-rotating elements to which they are attached; and means for sustaining said rotating member in stable equilibrium until said rotating member has exceeded said critical angular velocity.

2. The apparatus of claim 1, wherein said magnetic means comprise:

an outer array of circuits; and an inner cylindrical slotted pole that rotates within said outer array of circuits;

and wherein said sustaining means comprise a pair of mechanically disengaging bearings.

3. The apparatus of claim 1, further comprising a vertical shaft fixedly connected to said rotating member through said central axis of rotation.

4. The apparatus of claim 3, further comprising means for rotating said rotating member.

5. The apparatus of claim 4, wherein said rotating member is a rotor.

6. The apparatus of claim 1, wherein said rotating member is positioned to utilize the force of gravity to suppress tilt instabilities.

7. The apparatus of claim 3, wherein said magnetic stabilization means comprise:

at least one radial stabilization element; and at least one axial stabilization element.

8. The apparatus of claim 7, wherein said at least one radial stabilization element comprises a repelling magnetic bearing element comprising:

a rotatable upper annular ring comprising permanent magnet material; and a lower annular ring comprising permanent magnet material;

and wherein said upper ring and said lower ring have different diameters and magnetically oppose each other.

9. The apparatus of claim 7, wherein said at least one radial stabilization element comprises a compound attractive magnetic bearing element comprising:

an upper stationary element comprising:
  a piece of permanent magnet material;
  a piece of soft magnetizable material magnetically connected to and beneath said piece of permanent magnet material; and
  a support fixedly connected to said piece of soft magnetizable material; and
a lower rotatable element magnetically connected to and beneath said upper stationary element, said lower rotatable element comprising:
  a piece of soft magnetizable material;
  a piece of permanent magnetic material; and
  a spacer comprising non-magnetic material, wherein said spacer is fixedly connected to and between said piece of soft magnetizable material and said piece of permanent magnet material.

10. The apparatus of claim 7, wherein said at least one radial stabilization element comprises an axially symmetric reduced derivative attractive bearing element comprising:

a first element comprising:
  a disc shaped iron structure having a central axis;
  a hollow cylinder of alternating permanent magnet material and iron shims, wherein said hollow cylinder is fixedly connected to the outer edge of said disc shaped iron structure; and
  a cylindrical column fixedly connected to said central axis of said disc shaped iron structure on the same side as that of said hollow cylinder, wherein said cylindrical column comprises alternating washer-shaped pieces of soft iron and spacers, and wherein said spacers are selected from a group consisting of non-magnetic material and saturable magnetic material; and
a second element comprising soft iron, further comprising a disc shaped structure having pole faces disposed opposite said hollow cylinder and said cylindrical column.

11. The apparatus of claim 7, wherein said at least one radial stabilization element comprises a reduced derivative, repelling-type magnetic bearing element comprising:

a first element comprising:
  a disc shaped iron structure;
  a hollow cylinder of alternating permanent magnet material and iron shims, wherein said cylinder is fixedly connected to the outer edge of said disc shaped iron structure; and
  a cylindrical column fixedly connected to the central axis of said disc shaped iron structure on the same side as that of said hollow cylinder, wherein said cylindrical column comprises alternating washer-shaped pieces of soft iron and spacers, and wherein said spacers are selected from a group consisting of non-magnetic material and saturable magnetic material; and a second element comprising:
  a disc shaped iron structure;
  a hollow cylinder of alternating permanent magnet material and iron shims, wherein said cylinder is fixedly connected to the outer edge of said disc shaped iron structure; and
  a cylindrical column fixedly connected to the central axis of said disc shaped iron structure on the same side as that of said hollow cylinder, wherein said cylindrical column comprises alternating washer-shaped pieces of soft iron and spacers, and wherein said spacers are selected from a group consisting of non-magnetic material and saturable magnetic material;

and wherein said first element and said second element are positioned such that their magnetic fields oppose each other.

12. The apparatus of claim 7, wherein said at least one axial stabilization element comprises a slotted-pole magnetic bearing element comprising:
  a soft iron piece;
  a plurality of permanent magnet material diposed on said soft iron piece to form a plurality of poles; and
  soft iron disposed on said plurality of poles; and wherein said bearing element is connected with an element selected from a group consisting of a conducting plate and an array of inductive loops.

13. The apparatus of claim 7, wherein said at least one radial stabilization element comprises a cylindrical slotted-pole element comprising:
  an inner cylinder comprising alternating soft iron and permanent magnet material; and
  an outer conducting element, wherein relative rotation occurs between said inner cylinder and said outer conducting surface.

14. The apparatus of claim 13, wherein said outer conducting element is selected from a group consisting of a conducting surface and an array of circuits.

15. The apparatus of claim 14, wherein at least one circuit of said array of circuits comprises conducting loops selected from a group consisting of an inductively shorted circuit, a non-linear resistor, and a diode and fixed voltage device.

16. The apparatus of claim 7, wherein said axial stabilization element comprises an axial repelling-type magnetic bearing element using opposing slotted poles, said axial repelling-type magnetic bearing element comprising
  a first annular slotted pole magnetic assembly selected from a group consisting of a series of slotted poles and thin slabs of permanent magnet material; and
  a second annular slotted pole magnetic assembly, wherein said first assembly magnetically opposes said second assembly and wherein said first and second assembly are rotatable in opposite directions relative to each other.

17. The apparatus of claim 1, wherein said sustaining means comprise a centrifugally disengaging mechanical bearing element comprising:
  an inner ball bearing race fixedly connected to said rotating member;
  an outer ball bearing race having an inner surface in contact with the outer surface of said inner ball bearing race;
  four retainer quadrants each having an inner surface in contact with said outer ball bearing race;
  an outer rotatable annular element; and
  spring elements fixedly connected to the inner surface of said outer rotatable element, wherein said spring elements expand under the influence of centrifugal forces and disengage from said retainer quadrants.

18. The apparatus of claim 5, wherein said magnetic means comprises:

two radial stabilization elements, each connected to said shaft on opposite sides of said rotor; and an axial stabilization element.

19. The apparatus of claim 18, wherein each of said two radial stabilization elements comprises:

an outer, annular, permanent magnet; and an inner, disc shaped permanent magnet fixedly connected to said shaft and magnetically connected to said outer magnet, wherein said inner magnet is displaced slightly above and has the same sense of magnetization as that of said outer magnet.

20. The apparatus of claim 18, wherein at least one of said two radial stabilization elements comprises a reduced-derivative radially-stable bearing element.

21. The apparatus of claim 18, wherein said axial stabilization element comprises an eddy current actuated assembly comprising:

a slotted pole face fixedly connected to the top of said shaft; and a conducting plate magnetically opposing said slotted pole face, wherein said assembly counterbalances the sum of the upward force exerted by said radial stabilization elements;

and wherein said sustaining means comprise a ball located between said slotted pole face and said conducting plate, wherein said ball provides axial stabilization at speeds below the operation speed of said eddy current actuated assembly.

22. The apparatus of claim 18, wherein said axial stabilization element comprises an opposing slotted pole assembly.

23. The apparatus of claim 18, further comprising vibration dampers to overcome rotor-dynamic instabilities.

24. The apparatus of claim 5, wherein said magnetic means comprises:

two radial stabilization elements, each connected to said shaft on opposite sides of said rotor; and two axial stabilization elements, each connected to opposite ends of said shaft.

25. The apparatus of claim 24, wherein at least one of said two radial stabilization elements comprises:

a thick-walled conducting cylinder; and a slotted pole fixedly connected to said shaft and magnetically connected to said cylinder.

26. The apparatus of claim 24, wherein at least one of said two radial stabilization elements comprises opposing slotted poles.

27. The apparatus of claim 24, wherein at least one of said two axial stabilization elements comprises:

a first disc shaped permanent magnet fixedly connected to said shaft; and a second disc shaped permanent magnet magnetically opposing said first disc shaped magnet.

28. The apparatus of claim 24, wherein at least one of said two axial stabilization elements comprises a reduced-derivative repelling bearing element.

29. The apparatus of claim 5, wherein said magnetic means comprises:

a radial stabilization element connected to the upper end of said shaft; and an axial stabilization element connected to said shaft below said radial stabilization element and above said rotor; and wherein said shaft and said rotor are hung pendulously from said axial stabilization element.

30. The apparatus of claim 29, wherein said radial stabilization element comprises:

a thick-walled conducting cylinder; and a slotted pole fixedly connected to said shaft and magnetically connected to said cylinder.

31. The apparatus of claim 29, wherein said radial stabilization element comprises opposing slotted poles.

32. The apparatus of claim 29, wherein said axial stabilization element comprises:

a disc shaped permanent magnet fixedly connected to said shaft below said radial stabilization element; and an annular piece of permanent magnet material fixedly placed below and magnetically opposing said disc shaped permanent magnet.

33. The apparatus of claim 12, wherein:

said soft iron piece comprises a disc shaped member;

said plurality of permanent magnet material pieces comprise four quadrants; and said plurality of poles comprise at least one slot.

34. The apparatus of claim 7, wherein said radial stabilization element comprises a compound attractive magnetic bearing element comprising:

an upper stationary element comprising:

a reduced-derivative magnetic bearing element;

a piece of soft magnetizable material magnetically connected to and beneath said reduced-derivative magnetic bearing element; and a support fixedly connected to said piece of soft magnetizable material; and a lower rotatable element magnetically connected to and beneath said upper stationary element, said lower rotatable element comprising:

a piece of soft magnetizable material;

a piece of permanent magnetic material; and a spacer comprising non-magnetic material, wherein said spacer is fixedly connected to and between said piece of soft magnetizable material and said piece of permanent magnet material.

35. The apparatus of claim 1, wherein said magnetic means comprise:

an outer conducting surface; and an inner cylindrical slotted pole that rotates within said outer conducting surface; and wherein said sustaining means comprise a pair of mechanically disengaging bearings.

36. The apparatus of claim 7, wherein said radial stabilization element comprises a cylindrical slotted-pole element comprising:

an inner conducting cylinder;

an outer cylinder; and magnet bars fixedly connected to the inner surface of said outer cylinder wherein said magnet bars are magnetically connected to said inner conducting cylinder and wherein said magnet bars have directions of magnetization that are rotated at right angles with respect to an adjacent magnet bar.

* * * * *